United States Patent
Takahashi et al.

(10) Patent No.: US 10,958,365 B2
(45) Date of Patent: Mar. 23, 2021

(54) RECEPTION APPARATUS, RECEPTION METHOD, TRANSMISSION APPARATUS, AND TRANSMISSION METHOD

(71) Applicant: SONY SEMICONDUCTOR SOLUTIONS CORPORATION, Atsugi (JP)

(72) Inventors: Kazuyuki Takahashi, Chiba (JP); Lachlan Bruce Michael, Saitama (JP); John Nicholas Wilson, Weybridge (GB)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 36 days.

(21) Appl. No.: 16/330,920

(22) PCT Filed: Oct. 26, 2017

(86) PCT No.: PCT/JP2017/038705
§ 371 (c)(1),
(2) Date: Mar. 6, 2019

(87) PCT Pub. No.: WO2018/088223
PCT Pub. Date: May 17, 2018

(65) Prior Publication Data
US 2019/0238245 A1 Aug. 1, 2019

(30) Foreign Application Priority Data
Nov. 9, 2016 (JP) .............................. JP2016-218885

(51) Int. Cl.
*H04H 20/59* (2008.01)
*H04N 21/2362* (2011.01)
(Continued)

(52) U.S. Cl.
CPC ............... *H04H 20/59* (2013.01); *H04B 1/16* (2013.01); *H04H 60/42* (2013.01);
(Continued)

(58) Field of Classification Search
None
See application file for complete search history.

(56) References Cited

U.S. PATENT DOCUMENTS

2005/0166221 A1* 7/2005 Pugel ..................... H04H 60/13
725/33
2006/0005219 A1* 1/2006 Owens ................. H04N 21/814
725/33
(Continued)

FOREIGN PATENT DOCUMENTS

JP 2008-148230 A 6/2008
JP 2015-80172 A 4/2015
(Continued)

OTHER PUBLICATIONS

Extended European Search Report dated Jul. 16, 2019, in Patent Application No. 17869303.2, 12 pages.
(Continued)

*Primary Examiner* — Alexander Q Huerta
(74) *Attorney, Agent, or Firm* — Oblon, McClelland, Maier & Neustadt, L.L.P.

(57) ABSTRACT

The present technology relates to a reception apparatus, a reception method, a transmission apparatus, and a transmission method that enable provision of an emergency warning service more suited to actual operation.
Provided is a reception apparatus that includes a reception section and a demodulation section. The reception section receives a physical layer frame transported as a broadcast signal. The demodulation section demodulates physical layer signalling acquired from the physical layer frame and
(Continued)

monitors whether or not emergency warning information has been transported on a basis of emergency warning notice information acquired as a result of the demodulation. In a case where the emergency warning notice information indicates that the emergency warning information has been transported, the reception apparatus starts up automatically. The present technology is applicable, for example, to a transport system for transporting a physical layer frame compliant with a DVB-T2 standard.

16 Claims, 23 Drawing Sheets

(51) Int. Cl.
| | |
|---|---|
| *H04N 21/442* | (2011.01) |
| *H04N 21/443* | (2011.01) |
| *H04N 21/81* | (2011.01) |
| *H04N 21/414* | (2011.01) |
| *H04B 1/16* | (2006.01) |
| *H04N 21/438* | (2011.01) |
| *H04N 21/2383* | (2011.01) |
| *H04H 60/42* | (2008.01) |
| *H04N 21/478* | (2011.01) |
| *H04N 21/488* | (2011.01) |
| *H04N 21/41* | (2011.01) |

(52) U.S. Cl.
CPC ..... *H04N 21/2362* (2013.01); *H04N 21/2383* (2013.01); *H04N 21/41* (2013.01); *H04N 21/41407* (2013.01); *H04N 21/4382* (2013.01); *H04N 21/4383* (2013.01); *H04N 21/442* (2013.01); *H04N 21/4436* (2013.01); *H04N 21/478* (2013.01); *H04N 21/4882* (2013.01); *H04N 21/814* (2013.01)

(56) References Cited

U.S. PATENT DOCUMENTS

| | | | | |
|---|---|---|---|---|
| 2007/0136743 | A1* | 6/2007 | Hasek | H04N 21/6125 |
| | | | | 725/33 |
| 2013/0074120 | A1* | 3/2013 | Adimatyam | H04N 21/814 |
| | | | | 725/33 |
| 2013/0247094 | A1* | 9/2013 | Hardin | H04N 21/814 |
| | | | | 725/33 |
| 2014/0007158 | A1* | 1/2014 | Bhagwat | G08B 27/005 |
| | | | | 725/33 |
| 2016/0119677 | A1* | 4/2016 | Oh | H04N 21/242 |
| | | | | 725/101 |
| 2016/0192033 | A1* | 6/2016 | Kitahara | G08B 27/008 |
| | | | | 725/33 |
| 2016/0211931 | A1* | 7/2016 | Takahashi | H04W 4/90 |
| 2016/0255416 | A1 | 9/2016 | Yoshimochi et al. | |
| 2016/0277133 | A1* | 9/2016 | Stewart | H04L 27/2601 |
| 2017/0013093 | A1* | 1/2017 | Kwon | H04L 65/4076 |
| 2017/0054520 | A1* | 2/2017 | Kwak | H04H 20/59 |
| 2017/0171722 | A1* | 6/2017 | Lee | H04H 20/59 |
| 2017/0201337 | A1* | 7/2017 | Michael | H04N 21/4343 |
| 2017/0207867 | A1* | 7/2017 | Kwon | H04W 4/90 |

FOREIGN PATENT DOCUMENTS

| | | |
|---|---|---|
| WO | WO 2015/126181 A2 | 8/2015 |
| WO | WO 2016/006472 A1 | 1/2016 |
| WO | WO 2016/036077 A1 | 3/2016 |

OTHER PUBLICATIONS

Stare, E., "DVB-T2 Emergency Warning System (EWS)", Digital Video Broadcasting, XP017852380, Oct. 31, 2016, 9 pages.

Digital Video Broadcasting, "Emergency Warning System—inserting (a) corresponding alert flag(s) into DVB-T2", XP017852377, Oct. 31, 2016, 18 pages.

Advanced Television Systems Committee, "ATSC Candidate Standard: Signaling, Delivery, Synchronization, and Error Protection", XP017851376, Oct. 4, 2016, 196 pages.

Advanced Television Systems Committee, "ATSC Standard: A/321, System Discovery and Signaling", XP017848736, Mar. 23, 2016, 36 pages.

European Standard, European Telecommunications Standards Institute (ETSI), "Digital Video Broadcasting (DVB); Frame structure channel coding and modulation for a second generation digital terrestrial television broadcasting system (DVB-T2)", XP014248184, No. V1.4.1, Feb. 1, 2015, 193 pages.

International Search Report dated Jan. 23, 2018 in PCT/JP2017/038705, 1 page.

* cited by examiner

FIG.8

| Padding field mapping for in-band type A ||
|---|---|
| Field | Size |
| PADDING_TYPE ('00') | 2bits |
| PLP_L1_CHANGE_COUNTER | 8bits |
| RESERVED_1 | 8bits |
| For j=0..P$_I$-1 { | |
|     SUB_SLICE_INTERVAL | 22bits |
|     START_RF_IDX | 3bits |
|     CURRENT_PLP_START | 22bits |
|     RESERVED_2 | 8bits |
| } | |
| CURRENT_PLP_NUM_BLOCKS | 10bits |
| NUM_OTHER_PLP_IN_BAND | 8bits |
| For i=0..NUM_OTHER_PLP_IN_BAND-1 { | |
|     PLP_ID | 8bits |
|     PLP_START | 22bits |
|     PLP_NUM_BLOCKS | 10bits |
|     RESERVED_3 | 8bits |
| } | |
| For j=0..P$_I$-1 { | |
|     TYPE_2_START | 22bits |
| } | |

FIG.9

| Padding field mapping for in-band type B ||
| --- | --- |
| Field | Size |
| PADDING_TYPE ('01') | 2bits |
| TTO | 31bits |
| FIRST_ISCR | 22bits |
| BUFS_UNIT | 2bits |
| BUFS | 10bits |
| TS_RATE | 27bits |
| RESERVED_B | 8bits |

FIG. 10

L1-post Configurable RESERVED_2

| Syntax | No of bits | Semantics |
|---|---|---|
| EMERGENCY_WARNING | 1 | EMERGENCY WARNING NOTICE INFORMATION (EMERGENCY WARNING FLAG) |
| EWS_VERSION | 5 | VERSION OF EMERGENCY WARNING INFORMATION |
| SERVICE_ID | 16 | SERVICE ID TO TUNE AFTER AUTOMATIC STARTUP |
| EWS_CODE | 8 | TYPE CODE OF EMERGENCY WARNING |

FIG. 11

L1-post Configurable RESERVED_2

| Syntax | No of bits | Semantics |
|---|---|---|
| EMERGENCY_WARNING | 1 | EMERGENCY WARNING NOTICE INFORMATION (EMERGENCY WARNING FLAG) |
| EWS_VERSION | 5 | VERSION OF EMERGENCY WARNING INFORMATION |
| SERVICE_ID | 16 | SERVICE ID TO TUNE AFTER AUTOMATIC STARTUP |
| EWS_CODE | 8 | TYPE CODE OF EMERGENCY WARNING |

AUX_PRIVATE_CONF (AUX_STREAM_TYPE=1111 (Emergency Signalling))

| Syntax | No of bits | Semantics |
|---|---|---|
| AUX_PRIVATE_CONF { | | |
| COUNTRY_CODE | 16 | COUNTRY CODE (ISO2 BYTECODE, ISO 3166-1 alpha-2) |
| REGION_CODE | 8 | DOMESTIC REGION CODE |
| RESERVED | 4 | FUTURE EXPANSION |
| } | | |

FIG. 12

L1-post Configurable RESERVED_2

| Syntax | No of bits | Semantics |
|---|---|---|
| EMERGENCY_WARNING | 1 | EMERGENCY WARNING NOTICE INFORMATION (EMERGENCY WARNING FLAG) |
| EWS_VERSION | 5 | VERSION OF EMERGENCY WARNING INFORMATION |
| SERVICE_ID | 16 | SERVICE ID TO TUNE AFTER AUTOMATIC STARTUP |
| EWS_CODE | 8 | TYPE CODE OF EMERGENCY WARNING |

AUX_PRIVATE_CONF (AUX_STREAM_TYPE=1111 (Emergency Signalling))

| Syntax | No of bits | Semantics |
|---|---|---|
| AUX_PRIVATE_CONF { | | |
| COUNTRY_CODE | 16 | COUNTRY CODE (ISO2 BYTECODE, ISO 3166-1 alpha-2) |
| REGION_CODE | 8 | DOMESTIC REGION CODE |
| AUX_EWS_STREAM | 1 | FLAG INDICATING TRANSFER OF ADDITIONAL INFORMATION AS AUXILIARY STREAM |
| AUX_EWS_STREAM_TYPE | 2 | EWS AUXILIARY STREAM TYPE (E.G., 0: TEXT, 1: AUDIO, 2: APPLICATION STARTUP INFORMATION, 3: FUTURE RESERVATION) |
| RESERVED | 1 | FUTURE EXPANSION |
| } | | |

FIG. 13

L1-post Configurable RESERVED_2

| Syntax | No of bits | Semantics |
|---|---|---|
| EMERGENCY_WARNING | 1 | EMERGENCY WARNING NOTICE INFORMATION (EMERGENCY WARNING FLAG) |
| EWS_VERSION | 5 | VERSION OF EMERGENCY WARNING INFORMATION |
| COUNTRY_CODE | 16 | COUNTRY CODE (ISO2 BYTECODE, ISO 3166-1 alpha-2) |
| REGION_CODE | 8 | DOMESTIC REGION CODE |

Dynamic AUX_PRIVATE_DYN

| Syntax | No of bits | Semantics |
|---|---|---|
| AUX_PRIVATE_DYN{ | | |
| TS_ID | 16 | TS_ID TO TUNE AFTER AUTOMATIC STARTUP |
| PLP_ID | 8 | PLP_ID TO TUNE AFTER AUTOMATIC STARTUP |
| SERVICE_ID | 16 | SERVICE ID TO TUNE AFTER AUTOMATIC STARTUP |
| EWS_CODE | 8 | TYPE CODE OF EMERGENCY WARNING |
| } | | |

FIG. 18

Signaling Fields for Bootstrap Symbol 1

| Syntax | No. of Bits | Format |
|---|---|---|
| bootstrap_symbol_1() { | | |
| ea_wake_up_1 | 1 | uimsbf |
| min_time_to_next | 5 | uimsbf |
| system_bandwidth | 2 | uimsbf |
| } | | |

FIG. 19

Signaling Fields for Bootstrap Symbol 2

| Syntax | No. of Bits | Format |
|---|---|---|
| bootstrap_symbol_201 { | | |
| ea_wake_up_2 | 1 | uimsbf |
| bsr_coefficient | 7 | uimsbf |
| } | | |

FIG. 20

| Value | Meaning |
|---|---|
| '00' | No emergency to wake up devices is currently signaled |
| '01' | Emergency to wake up devices-setting 1 |
| '10' | Emergency to wake up devices-setting 2 |
| '11' | Emergency to wake up devices-setting 3 |

Meaning of Wake-up Bits

RECEPTION APPARATUS, RECEPTION METHOD, TRANSMISSION APPARATUS, AND TRANSMISSION METHOD

TECHNICAL FIELD

The present technology relates to a reception apparatus, a reception method, a transmission apparatus, and a transmission method, and relates more particularly to a reception apparatus, a reception method, a transmission apparatus, and a transmission method that permit provision of an emergency warning service more suited to actual operation.

BACKGROUND ART

The DVB-T (Digital Video Broadcasting-Terrestrial) standard has been adopted not only in Europe but across the world as a digital terrestrial broadcasting standard. Further, at present, the DVB-T2 standard, a revised version of this DVB-T standard, has become commercial (refer, for example, to NPL 1).

Also, an emergency warning system (EWS: Emergency Warning System) is prescribed as means conveying a warning in the event of an emergency such as natural disasters represented by earthquake and tsunami (refer, for example, to PTL 1).

CITATION LIST

Patent Literature

[PTL 1]
Japanese Patent Laid-Open No. 2008-148230

Non Patent Literature

[NPL 1]
ETSI EN 302 755 V1.4.1 (2015-07)

SUMMARY

Technical Problem

Incidentally, although an emergency warning system has been introduced to the DVB-T2 standard and other broadcasting schemes, there is a demand to provide an emergency warning service more suited to actual operation, and proposals have been requested to realize such an emergency warning system.

The present technology has been devised in light of such circumstances, and it is an object of the present technology to allow provision of an emergency warning service more suited to actual operation.

Solution to Problem

A reception apparatus of a first aspect of the present technology includes a reception section and a demodulation section. The reception section receives a physical layer frame transported as a broadcast signal. The demodulation section demodulates physical layer signalling acquired from the physical layer frame and monitors whether or not emergency warning information has been transported on a basis of emergency warning notice information acquired as a result of the demodulation. In a case where the emergency warning notice information indicates that the emergency warning information has been transported, the reception apparatus starts up automatically.

The reception apparatus of the first aspect of the present technology may be an independent apparatus or an internal block included in a single apparatus. Also, a reception method of the first aspect of the present technology is a reception method corresponding to the reception apparatus of the first aspect of the present technology described above.

In the reception apparatus and the reception method of the first aspect of the present technology, a physical layer frame transported as a broadcast signal is received, and physical layer signalling acquired from the physical layer frame is demodulated, and whether or not emergency warning information has been transported is monitored on a basis of emergency warning notice information acquired as a result of the demodulation, and in a case where the emergency warning notice information indicates that the emergency warning information has been transported, the reception apparatus starts up automatically.

A transmission apparatus of a second aspect of the present technology includes a processing section and a transmission section. The processing section processes physical layer signalling that includes emergency warning notice information corresponding to whether or not emergency warning information has been transported, and generates a physical layer frame that includes the physical layer signalling. The transmission section transmits the physical layer frame as a broadcast signal.

The transmission apparatus of the second aspect of the present technology may be an independent apparatus or an internal block included in a single apparatus. Also, a transmission method of the second aspect of the present technology is a transmission method corresponding to the transmission apparatus of the second aspect of the present technology described above.

In the transmission apparatus and the transmission method of the second aspect of the present technology, physical layer signalling is processed that includes emergency warning notice information corresponding to whether or not emergency warning information has been transported, and a physical layer frame including the physical layer signalling is generated, and the physical layer frame is transported as a broadcast signal.

Advantageous Effect of Invention

According to the first and second aspects of the present technology, an emergency warning service more suited to actual operation can be provided.

It should be noted that the effects described herein are not necessarily limited and may be any of the effects described in this disclosure.

BRIEF DESCRIPTION OF DRAWINGS

FIG. 8 is a diagram illustrating a syntax of type A IN-BAND signalling.

FIG. 9 is a diagram illustrating a syntax of type B IN-BAND signalling.

FIG. 10 is a diagram illustrating a first example of bit assignment.

FIG. 11 is a diagram illustrating a second example of bit assignment.

FIG. 12 is a diagram illustrating a third example of bit assignment.

FIG. 13 is a diagram illustrating a fourth example of bit assignment.

FIG. 18 is a diagram illustrating a syntax of a Bootstrap Symbol 1.

FIG. 19 is a diagram illustrating a syntax of a Bootstrap Symbol 2.

FIG. 20 is a diagram illustrating meaning of a value of two-bit Wake-up bits.

DESCRIPTION OF EMBODIMENT

Figure 1:
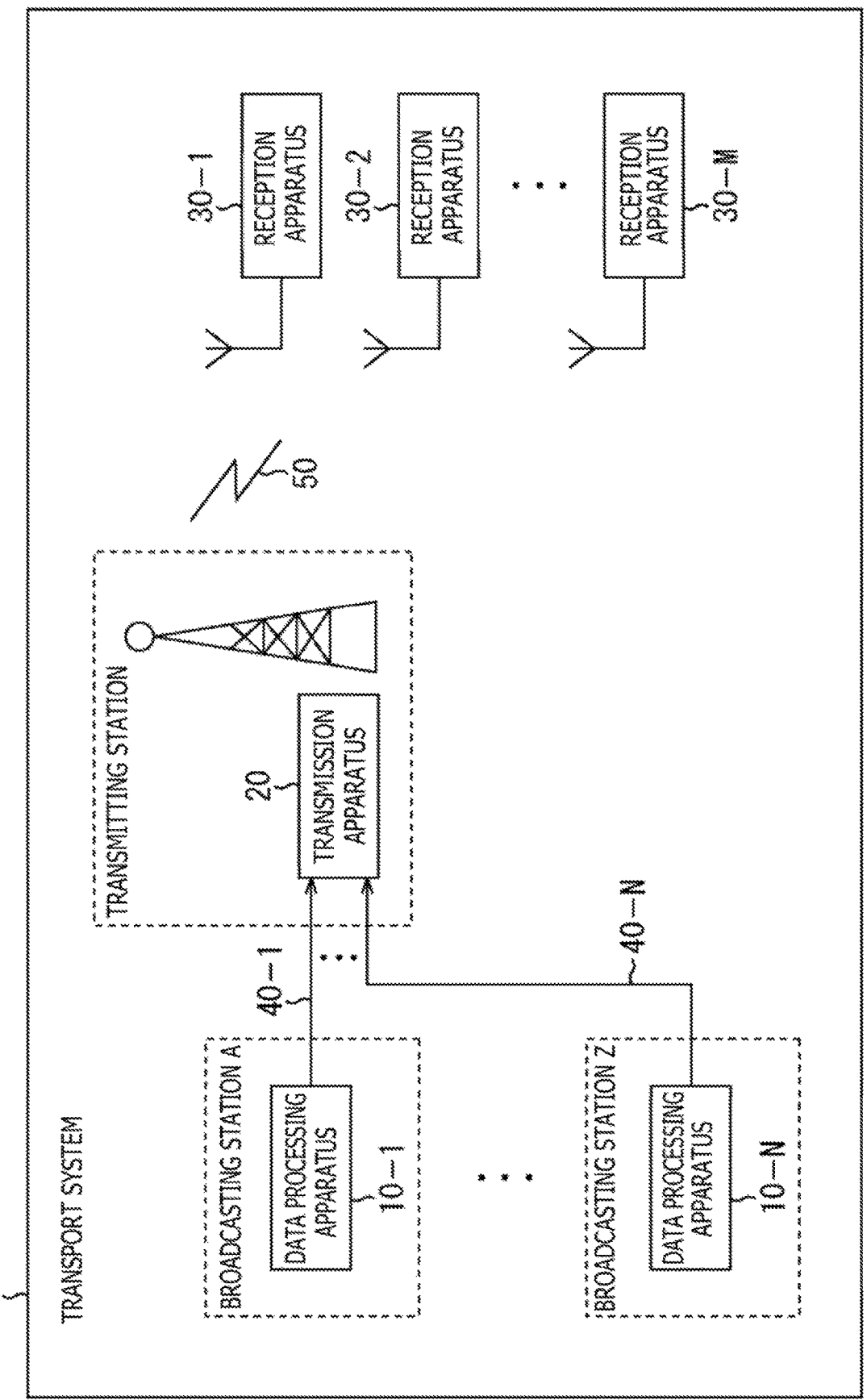
FIG. 1 is a block diagram illustrating a configuration of an embodiment of a transport system to which the present technology is applied.

A description will be given below of an embodiment of the present technology with reference to drawings. It should be noted that the description will be given in the following order:
1. System configuration
2. Overview of the present technology
3. Physical layer signalling
(1) L1-post signalling
(2) IN-BAND signalling
4. Specific examples of bit assignment
5. Supporting the M-PLP scheme
6. Example of emergency warning notice information
7. Example of low power consumption mode
8. Flow of the emergency warning information response processes
9. Modification example
10. Configuration of the computer

1. System Configuration (Configuration Example of the Transport System)

FIG. 1 is a block diagram illustrating a configuration of an embodiment of a transport system to which the present technology is applied. It should be noted that a system refers to a logical set of a plurality of apparatuses.

In FIG. 1, a transport system 1 includes data processing apparatuses 10-1 to 10-N (where N is an integer equal to or larger than one) installed in facilities related to respective broadcasting stations, a transmission apparatus 20 installed at a transmitting station, and reception apparatuses 30-1 to 30-M (where M is an integer equal to or larger than one) owned by users.

Also, in this transport system 1, the data processing apparatuses 10-1 to 10-N are connected to the transmission apparatus 20 via communication lines 40-1 to 40-N. It should be noted that leased lines, for example, can be used as the communication lines 40-1 to 40-N.

The data processing apparatus 10-1 processes content such as broadcast program produced by a broadcasting station A and transmits data to be transported acquired as a result thereof to the transmission apparatus 20 via the communication line 40-1.

In the data processing apparatuses 10-2 to 10-N, content such as broadcast programs produced by broadcasting stations B to Z is processed, and data to be transported acquired as a result thereof is transmitted to the transmission apparatus 20 via the communication lines 40-2 to 40-N as in the data processing apparatus 10-1.

The transmission apparatus 20 receives transported data transmitted from the data processing apparatuses 10-1 to 10-N on the side of the broadcasting stations via the communication lines 40-1 to 40-N. The transmission apparatus 20 processes transported data from the data processing apparatuses 10-1 to 10-N and transmits a broadcast signal acquired as a result thereof from a transmitting antenna installed at the transmitting station.

This allows the broadcast signal from the transmission apparatus 20 on the side of the transmitting station to be transmitted to the reception apparatuses 30-1 to 30-M via a broadcast transport channel 50.

The reception apparatuses 30-1 to 30-M are stationary receivers such as TV receivers, set top boxes (STB: Set Top Box), recorders, gaming consoles, and network storages, or mobile receivers such as smartphones, mobile phones, and tablet computers. Also, the reception apparatuses 30-1 to 30-M may be, for example, vehicle-mounted equipment mounted to vehicles such as vehicle-mounted TV receivers, or wearable computers such as head-mounted displays (HMD: Head Mounted Display).

The reception apparatus 30-1 reproduces content such as broadcast program corresponding to tuning operation performed by a user by receiving a broadcast signal transmitted from the transmission apparatus 20 via a broadcast transport channel 50 and processing the signal.

In the reception apparatuses 30-2 to 30-M, a broadcast signal from the transmission apparatus 20 is processed, and content corresponding to tuning operation performed by a user is reproduced as in the reception apparatus 30-1.

It should be noted that, in the transport system 1, the broadcast transport channel 50 may be not only terrestrial (terrestrial broadcasting) but also, for example, satellite broadcasting using a broadcasting satellite (BS: Broadcasting Satellite) or a communications satellite (CS: Communications Satellite), or wired broadcasting (CATV: Common Antenna TeleVision) using cables.

Also, in the transport system 1, although not illustrated, various servers may be connected to a communication line such as the Internet, so that the reception apparatuses 30-1 to 30-M having a communication function can receive various pieces of data such as content and applications by accessing the various servers for bidirectional communication via a communication line such as the Internet.

It should be noted that in a case where there is no particular need to distinguish among the data processing apparatuses 10-1 to 10-N on the side of the broadcasting stations, the data processing apparatuses 10-1 to 10-N will be referred to as the data processing apparatuses 10. Also, in a case where there is no particular need to distinguish among the reception apparatuses 30-1 to 30-M, the reception apparatuses 30-1 to 30-M will be referred to as the reception apparatuses 30.

(Configurations of the Apparatuses on the Transmitting Side)

Figure 2:
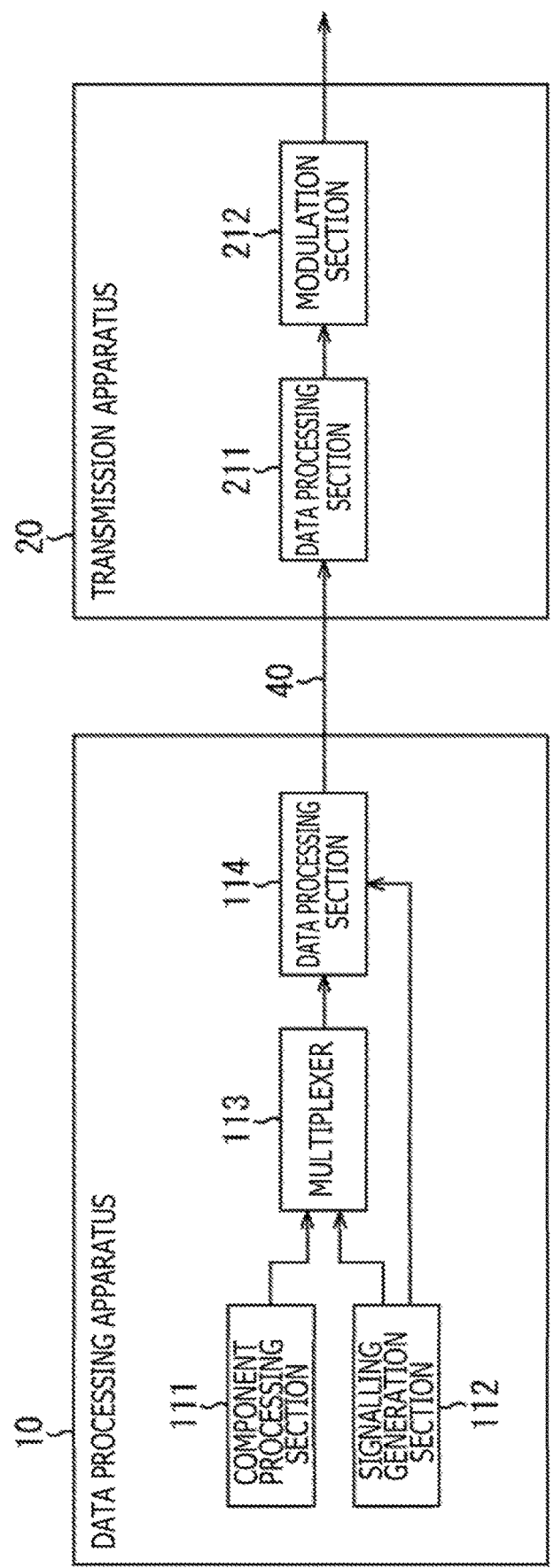
FIG. 2 is a block diagram illustrating a configuration example of a data processing apparatus and a transmission apparatus illustrated in FIG. 1.

FIG. 2 is a block diagram illustrating a configuration example of the data processing apparatus 10 and the transmission apparatus 20 illustrated in FIG. 1.

In FIG. 2, the data processing apparatus 10 includes a component processing section 111, a signalling generation section 112, a multiplexer 113, and a data processing section 114.

The component processing section 111 processes component data included in content such as broadcast programs and supplies a component stream acquired as a result thereof to the multiplexer 113. Here, component data is, for example, video, audio, subtitle, and other data, and a coding process compliant with a given coding scheme or other process, for example, is performed on these pieces of data.

The signalling generation section 112 generates signalling used for upper layer processes such as content tuning and reproduction and supplies signalling to the multiplexer 113. Also, the signalling generation section 112 generates signalling used for physical layer processes such as modulation and demodulation of a broadcast signal and supplies signalling to the data processing section 114.

It should be noted that signalling is also referred to as control information. Also, in the description given below, of signalling, that used for the processes in a physical layer will be referred to as physical layer signalling (L1 signalling), on the other hand, that used for processes in upper layers (Upper Layer) above the physical layer (Physical Layer) will be referred to as upper layer signalling, for distinction.

The multiplexer 113 multiplexes a component stream supplied from the component processing section 111 and an upper layer signalling stream supplied from the signalling generation section 112, and supplies the stream acquired as a result thereof to the data processing section 114. It should be noted here that other streams such as application or time information may be multiplexed.

The data processing section 114 processes the stream supplied from the multiplexer 113 and generates a packet (frame) in a given format. Also, the data processing section 114 generates data to be transported by processing the packet in the given format and physical layer signalling from the signalling generation section 112 and transmits the data to be transported to the transmission apparatus 20 via the communication line 40.

In FIG. 2, the transmission apparatus 20 includes a data processing section 211 and a modulation section 212.

The data processing section 211 receives and processes the transported data transmitted from the data processing apparatus 10 via the communication line 40 and extracts a packet (frame) in a given format and physical layer signalling information acquired as a result thereof.

The data processing section 211 generates a physical layer frame (physical layer frame) compliant with a given broadcasting scheme (e.g., DVB-T2 standard) by processing the packet (frame) in the given format and the physical layer signalling information and supplies the physical layer frame to the modulation section 212.

It should be noted that although a description is given in the configuration illustrated in FIG. 2 assuming that physical layer signalling is generated on the side of the data processing apparatuses 10 and transmitted to the transmission apparatus 20, physical layer signalling may be generated on the side of the transmission apparatus 20.

The modulation section 212 performs a necessary process (e.g., modulation process) on the physical layer frame supplied from the data processing section 211 and transmits a broadcast signal (RF signal) acquired as a result thereof from the transmitting antenna installed at the transmitting station.

The data processing apparatuses 10 and the transmission apparatus 20 are configured as described above.

(Configuration of the Apparatuses on the Receiving Side)

Figure 3:
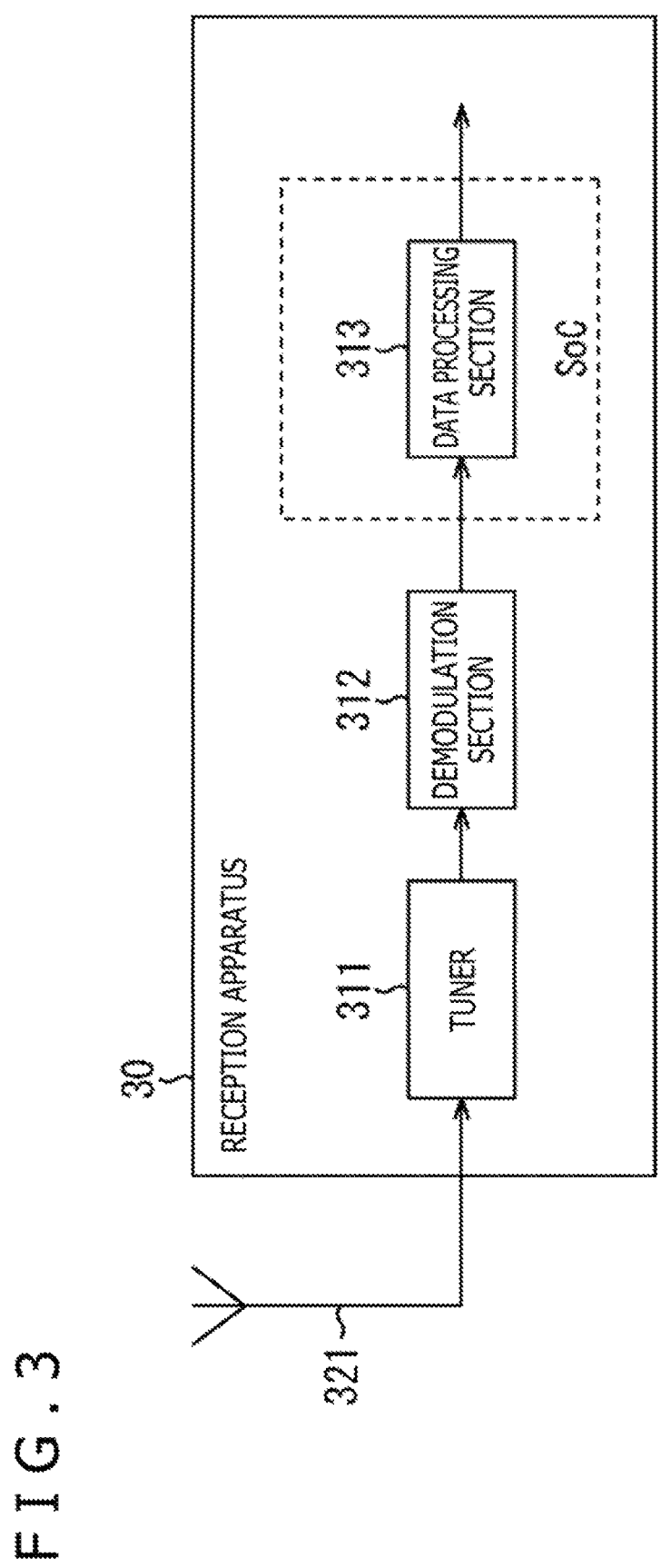
FIG. 3 is a block diagram illustrating a configuration example of a reception apparatus illustrated in FIG. 1.

FIG. 3 is a block diagram illustrating a configuration example of the reception apparatus 30 illustrated in FIG. 1.

In FIG. 3, the reception apparatus 30 includes a tuner 311, a demodulation section 312, and a data processing section 313.

The tuner 311 performs a necessary process on the broadcast signal (RF signal) received via an antenna 321 and supplies the signal acquired as a result thereof to the demodulation section 312.

The demodulation section 312 is configured, for example, as a demodulator such as demodulating LSI (Large Scale Integration). The demodulation section 312 performs a demodulation process on the signal supplied from the tuner 311. In this demodulation process, for example, a physical layer frame is processed in accordance with physical layer signalling, and a packet in a given format is acquired. The packet acquired as a result of this demodulation is supplied to the data processing section 313.

The data processing section 313 is configured, for example, as a system-on-chip (SoC: System On Chip). The data processing section 313 performs given processes on the packet supplied from the demodulation section 312. Here, for example, stream decoding and reproduction processes are performed on the basis of upper layer signalling acquired from the packet.

Video, audio, subtitle, and other data acquired by the processes performed by the data processing section 313 is output to circuits at later stages. This allows content such as broadcast programs to be reproduced and video and audio thereof to be output by the reception apparatuses 30.

The reception apparatuses 30 are configured as described above.

2. Overview of the Present Technology

Incidentally, people's lives are exposed to a variety of events such as natural disasters including earthquake, tsunami, typhoon, torrential rain, storm, tornado, flood, and forest fire.

In the event of such an event, it is necessary to prompt people to evacuate by notifying them of emergency warning information as soon as possible. Emergency warning information at the time of a disaster is provided, for example, by a governmental organization and so on. Also, this emergency warning information can be provided to users as an emergency warning service by using a broadcasting service that can be provided by the transport system 1 illustrated in FIG. 1.

Here, for example, in the emergency warning system prescribed in the DVB standard (DVB-EWS), voice data or the like has been transported as emergency warning information by using SI (Service Information) information.

However, this SI information is transported in an upper layer higher than the physical layer. Therefore, a receiver on standby cannot acquire the emergency warning information unless this information reaches the system-on-chip (SoC) provided at the later stage of the tuner and the demodulation section.

For this reason, the receiver on standby cannot analyze the emergency warning information unless the system-on-chip is started, resulting in more power consumed for this purpose. In particular, it is desirable to keep down the power consumption of the highly power consuming system-on-chip as much as possible.

Thus, in introducing an emergency warning system, there is a demand to introduce an emergency warning system capable of providing an emergency warning service more suited to actual operation including performing a process related to emergency warning information with less power consumption, and the like.

For this reason, the present technology proposes the following scheme in order to provide an emergency warning service more suited to actual operation.

That is, the present technology allows for provision of an emergency warning service more suited to actual operation by including, as physical layer signalling included in a physical layer frame, emergency warning notice information indicating whether or not emergency warning information has been transported, characteristic information indicating characteristics of emergency warning information, additional information notice information indicating whether or not additional information relating to emergency warning information has been transported, and so on.

It should be noted that, in the description given below, a T2 frame compliant with the DVB-T2 standard will be taken as an example. Also, L1-post signalling and IN-BAND signalling prescribed in the DVB-T2 standard will be taken as an example of physical layer signalling that includes information such as the above emergency warning notice information and characteristic information.

3. Physical Layer Signalling (Structure of the T2 Frame)

Figure 4:
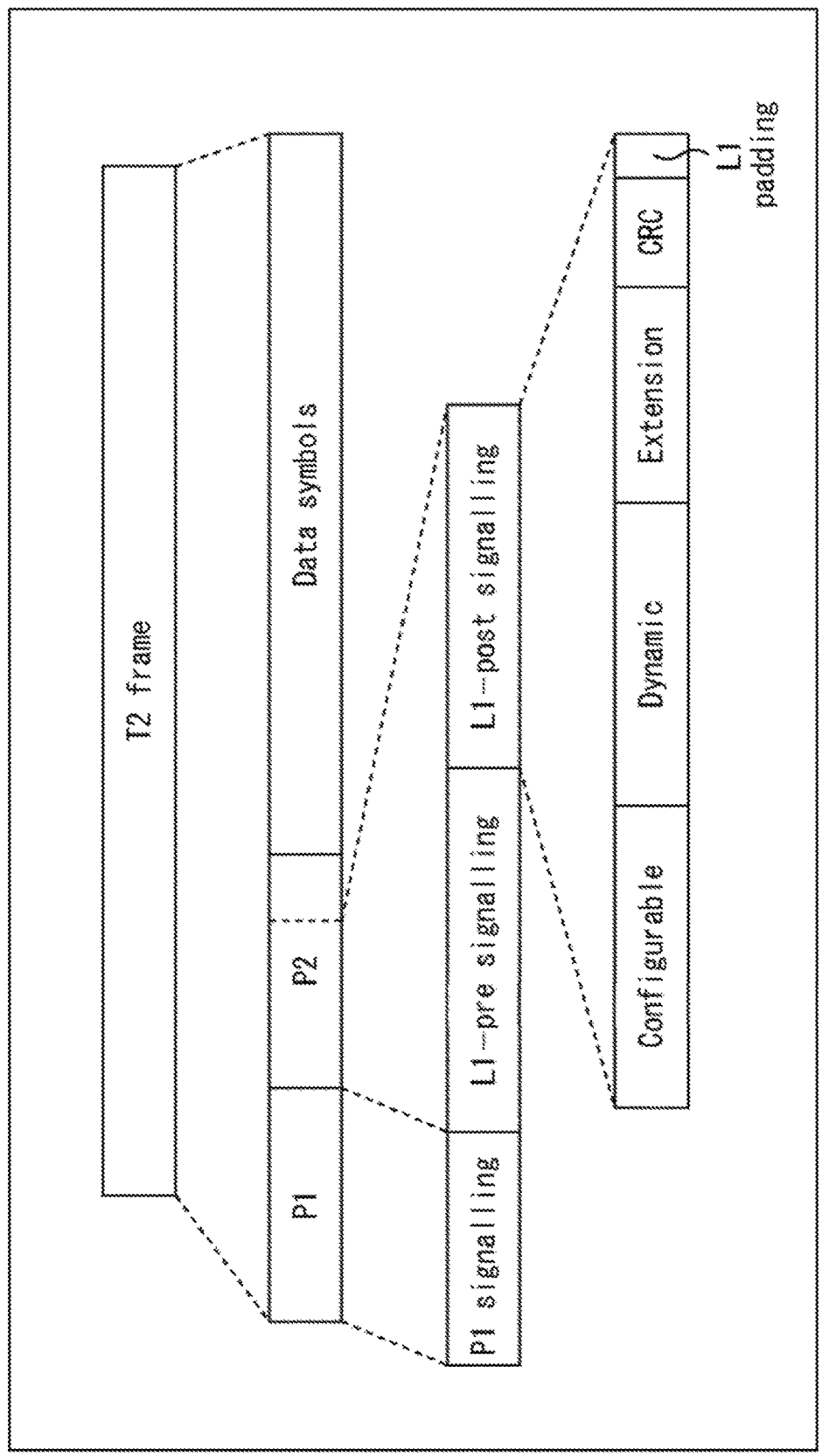
FIG. 4 is a diagram illustrating a structure of a T2 frame.

FIG. 4 is a diagram illustrating a structure of a T2 frame.

In the DVB-T2 standard, a frame called a T2 frame (T2 frame) is defined, and data is transmitted in units of a T2 frame. The T2 frame includes two types of preamble (Preamble) signals called P1 and P2, and these preamble signals include information required for a process of demodulation of OFDM (Orthogonal Frequency Division Multiplexing) signal and other processes.

The T2 frame includes a P1 symbol, a P2 symbol, and data symbols (Data symbols) in this order.

A P1 symbol is a symbol for transmitting P1 signalling (P1 signalling), and the P1 signalling includes a transmission type (transmission type) and basic transmission parameters (basic transmission parameters).

A P2 symbol is a symbol for transmitting L1-pre signalling (L1-pre signalling) and L1-post signalling (L1-post signalling). The L1-pre signalling includes information for a receiver that receives a T2 frame to receive and decode the L1-post signalling. The L1-post signalling includes parameters required for the receiver to access the physical layer (e.g., PLP (Physical Layer Pipes), and the like).

L1-post signalling includes two types of fields, Configurable and Dynamic L1-post signalling. Further, an optional Extension field for expansion purpose is available. Also, these fields are followed by a CRC (Cyclic Redundancy Check) and L1 padding in this order.

It should be noted that, in the DVB-T2 standard, it is possible to multiplex a frame called FEF (Future Extension Frame) having a structure different from a T2 frame in a time direction and transmit the multiplexed frame between T2 frames transmitted. Also, an auxiliary stream (Auxiliary Stream) can be included in a T2 frame together with PLPs.

Also, there are two kinds of T2 frames, a T2-Base frame targeted for stationary receivers such as TV receivers and a T2-Lite frame targeted for mobile receivers such as smartphones and tablet computers. Although classified by profile, these T2 frame types have a common structure irrespective of the profile type.

(1) L1 Post-Signalling (Syntax of Configurable L1-Post Signalling)

Figure 5:
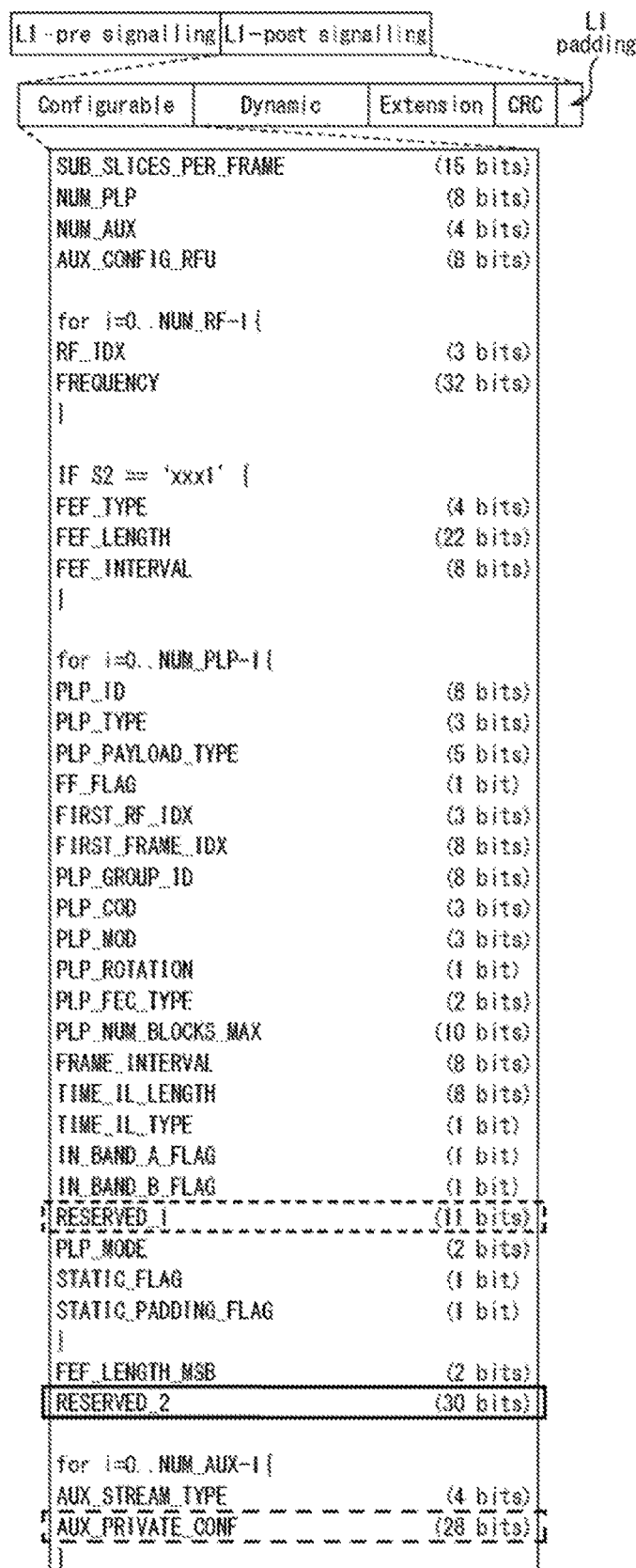
FIG. 5 is a diagram illustrating a syntax of Configurable L1-post signalling.

FIG. 5 is a diagram illustrating a syntax of configurable L1-post signalling.

SUB_SLICES_PER_FRAME, NUM_PLP, NUM_AUX, and AUX_CONFIG_RFU fields are provided in configurable L1-post signalling.

Thereafter, RF_IDX and FREQUENCY fields are provided in an RF loop corresponding to NUM_RF. Also, in a case where a relationship S2=='xxx1' is satisfied, FEF_TYPE, FEF_LENGTH, and FEF_INTERVAL fields are provided.

Further thereafter, PLP_ID, PLP_TYPE, PLP_PAYLOAD_TYPE, FF_FLAG, FIRST_RF_IDX, FIRST_FRAME_IDX, PLP_GROUP_ID, PLP_COD, PLP_MOD, PLP_ROTATION, PLP_FEC_TYPE, PLP_NUM_BLOCKS_MAX, FRAME_INTERVAL, TIME_IL_LENGTH, TIME_IL_TYPE, IN_BAND_A_FLAG, IN_BAND_B_FLAG, PLP_MODE, STATIC_FLAG, and STATIC_PADDING_FLAG fields are provided in a PLP loop corresponding to NUM_PLP.

Also, 11-bit RESERVED_1 is available in this PLP loop. Then, when the PLP loop is exited, an FEF_LENGTH_MSB field is provided followed by 30-bit RESERVED_2.

Thereafter, AUX_STREAM_TYPE and AUX_PRIVATE_CONF fields are provided in an AUX loop corresponding to NUM_AUX.

Here, AUX_STREAM_TYPE is a four-bit field that prescribes a type of an auxiliary stream (Auxiliary Stream). AUX_PRIVATE_CONF is a 28-bit field that prescribes details regarding an auxiliary stream.

It should be noted that, as indicated in "Table 36: Signalling format for the auxiliary stream type" in NPL 1 described above, in a case where bits '0000' are set as AUX_STREAM_TYPE, this indicates that the auxiliary stream is that of TX-SIG (Transmitter Signatures).

Also, the table indicates that, in AUX_STREAM_TYPE, bits other than '0000' are all reserved bits (Reserved for future use) for future use for expansion purpose. Here, in the present technology, for example, assigning bits '1111' to "Emergency Signalling" as AUX_STREAM_TYPE makes it possible to specify information regarding emergency warning in AUX_PRIVATE_CONF.

As described above, in configurable L1-post signalling, arbitrary information can be assigned to 11-bit RESERVED_1, 30-bit RESERVED_2, and 28-bit AUX_PRIVATE_CONF. In the present technology, therefore, information regarding emergency warning is assigned to these RESERVED and AUX_PRIVATE_CONF.

It should be noted that details of each field provided in configurable L1-post signalling are given in "7.2.3.1 Configurable L1-post signalling" in NPL 1 described above. Therefore, a detailed description thereof is omitted here.

(Syntax of Dynamic L1-Post Signalling)

Figure 6:
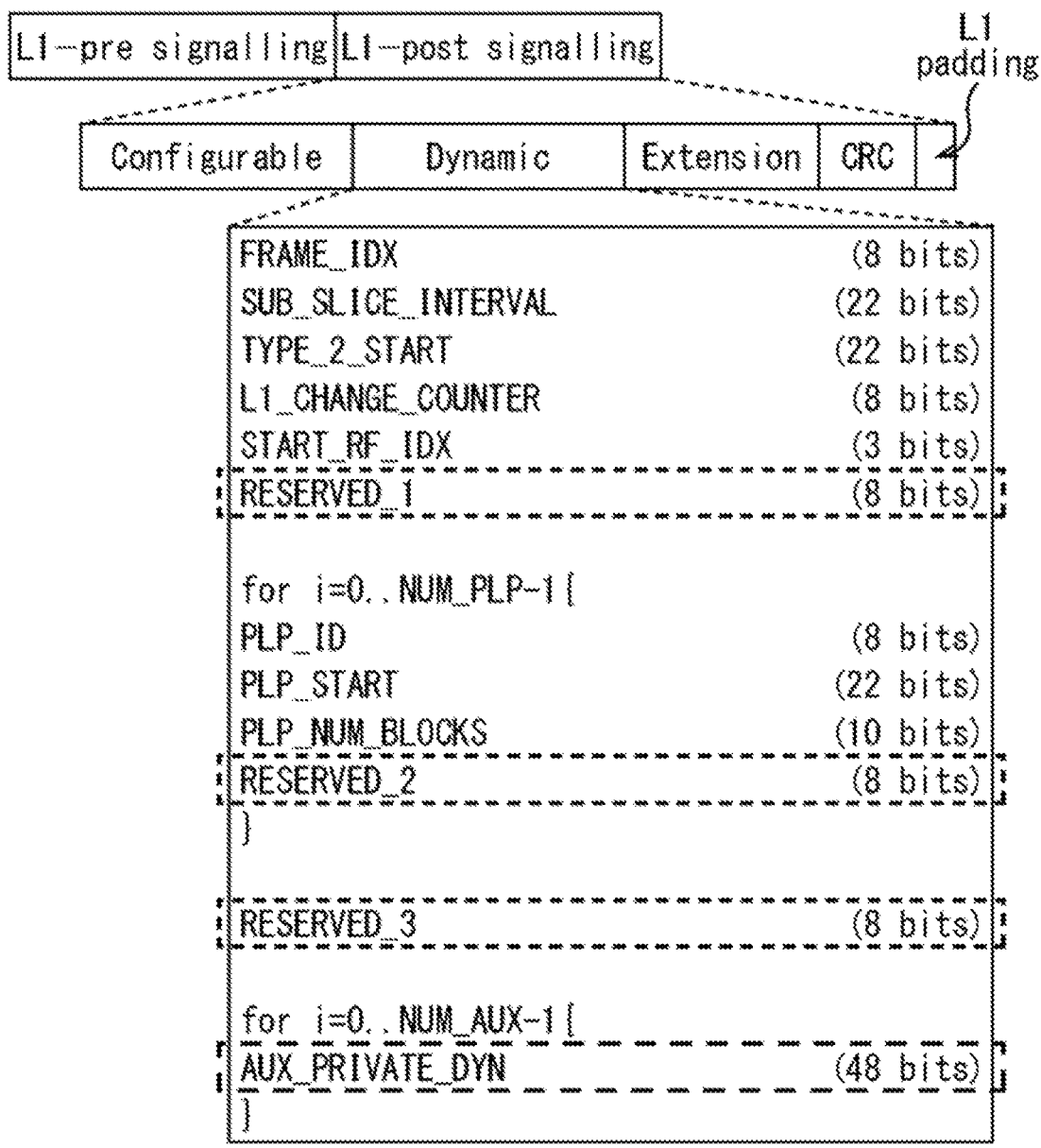
FIG. 6 is a diagram illustrating a syntax of Dynamic L1-post signalling.

FIG. 6 is a diagram illustrating a syntax of Dynamic L1-post signalling.

FRAME_IDX, SUB_SLICE_INTERVAL, TYPE_2_START, L1_CHANGE_COUNTER, and START RF_IDX fields are provided in Dynamic L1-post signalling.

Also, thereafter, eight-bit RESERVED_1 is available.

Thereafter, PLP_ID, PLP_START, and PLP_NUM_B-LOCKS fields are provided in the PLP loop corresponding to NUM_PLP.

Also, eight-bit RESERVED_2 is available in the PLP loop. Then, when the PLP loop is exited, eight-bit RESERVED_3 is further available.

Thereafter, AUX_PRIVATE_DYN is provided in the AUX loop corresponding to NUM_AUX. Here, AUX_PRIVATE_DYN is a 48-bit field that prescribes details regarding an auxiliary stream (Auxiliary Stream).

It should be noted that this AUX_PRIVATE_DYN specifies information regarding an auxiliary stream whose type is specified in AUX_STREAM_TYPE of configurable signalling illustrated in FIG. 5. That is, for example, in a case where bits '1111' indicating "Emergency Signalling" are specified as AUX_STREAM_TYPE, information regarding emergency warning can be specified in AUX_PRIVATE_DYN.

As described above, in Dynamic L1-post signalling, arbitrary information can be assigned to eight-bit RESERVED_1, eight-bit RESERVED_2, eight-bit RESERVED_3, and 48-bit AUX_PRIVATE_DYN. In the present technology, therefore, information regarding emergency warning is assigned to these RESERVED and AUX_PRIVATE_DYN.

It should be noted that details of each field provided in Dynamic L1-post signalling are given in "7.2.3.2 Dynamic L1-post signalling" in NPL 1 described above. Therefore, a detailed description thereof is omitted here.

(2) IN-BAND Signalling (Padding Field Format)

Figure 7:
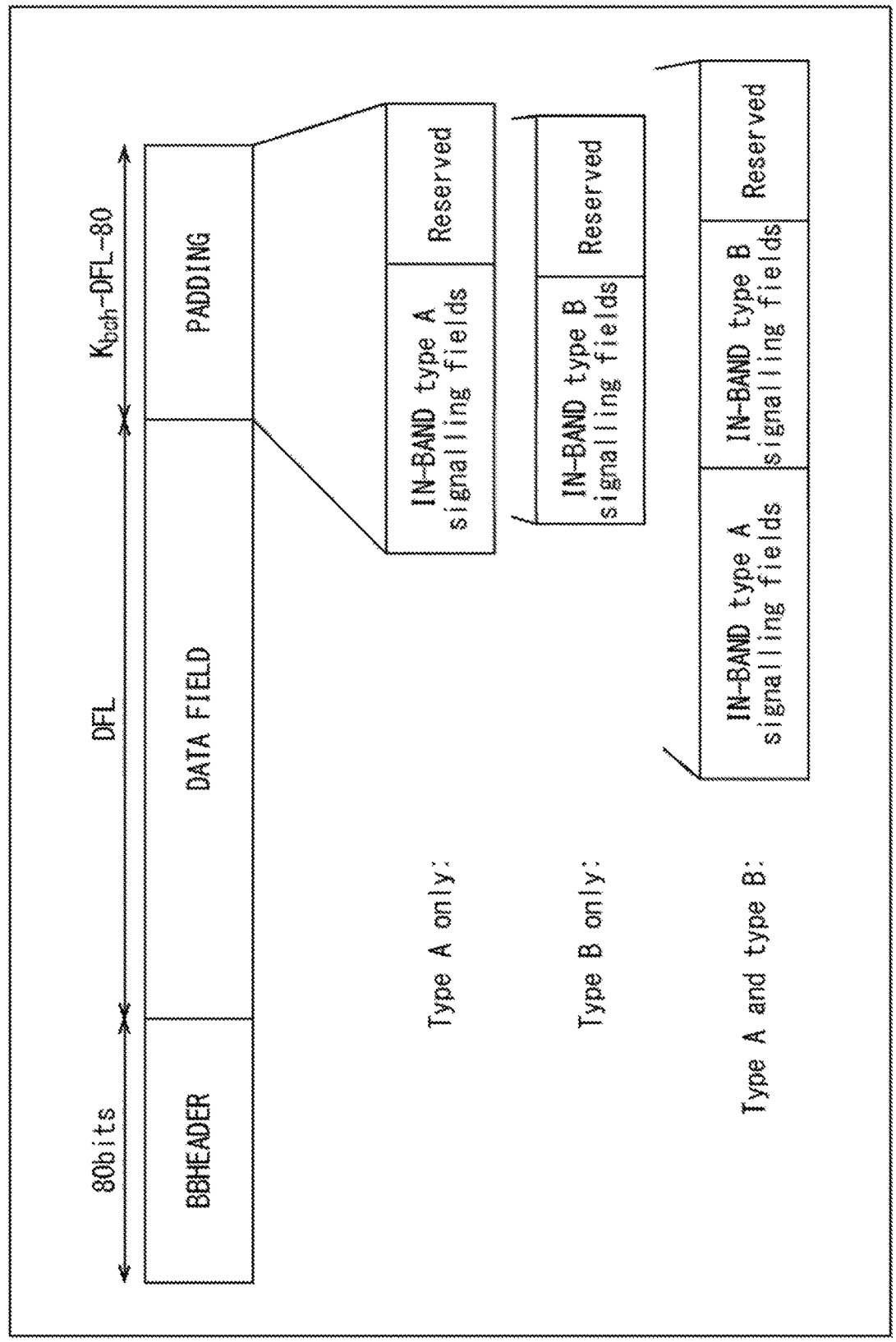
FIG. 7 is a diagram illustrating a structure in a case where a padding field of a BB frame is used as IN-BAND signalling.

FIG. 7 is a diagram illustrating a structure in a case where a padding field of a BB frame is used as IN-BAND signalling. It should be noted that a T2 frame includes a plurality of BB frames each having such a structure.

In FIG. 7, an 80-bit BB header (BBHEADER) is added to a data field (DATA FIELD) in a BB frame. Also, a padding (PADDING) field can be provided following the data field in a BB frame.

IN-BAND signalling fields can be provided in this padding field as illustrated in FIG. 7.

Here, there are three cases, a first case in which only a type A IN-BAND signalling field is provided, a second case in which only a type B IN-BAND signalling field is provided, and a third case in which type A and type B IN-BAND signalling fields are provided.

It should be noted that details of IN-BAND signalling are given in "5.2.3 Use of the padding field for in-band signalling" in NPL 1 described above.

(Syntax of Type A IN-BAND Signalling)

FIG. 8 is a diagram illustrating a syntax of type A IN-BAND signalling.

PADDING TYPE and PLP L1_CHANGE_COUNTER fields are provided in type A IN-BAND signalling. Also, thereafter, eight-bit RESERVED_1 is available.

Thereafter, SUB SLICE INTERVAL, START RF_IDX, and CURRENT PLP_START fields are provided in a $P_I$ loop corresponding to $P_I$.

Also, eight-bit RESERVED_2 is available in the $P_I$ loop. Then, when the $P_I$ loop is exited, CURRENT PLP_NUM_BLOCKS and NUM_OTHER_PLP_IN_BAND fields are provided.

Thereafter, PLP_ID, PLP_START, and PLP_NUM_B-LOCKS fields are provided in an OTHER_PLP_IN_BAND loop corresponding to NUM_OTHER_PLP_IN_BAND.

Also, eight-bit RESERVED_3 is available in the OTHER_PLP_IN_BAND loop. Then, when the OTHER_PLP_IN_BAND loop is exited, a TYPE_2_START field is provided in the $P_I$ loop corresponding to $P_I$.

As described above, in type A IN-BAND signalling, arbitrary information can be assigned to eight-bit RESERVED_1, eight-bit RESERVED_2, and eight-bit RESERVED_3. In the present technology, therefore, information regarding emergency warning is assigned to these RESERVED.

It should be noted that details of each field provided in type A IN-BAND signalling are given in "5.2.3.1 In-band type A" in NPL 1 described above. Therefore, a detailed description thereof is omitted here.

(Syntax of Type B IN-BAND Signalling)

FIG. 9 is a diagram illustrating a syntax of type B IN-BAND signalling.

PADDING_TYPE, TTO, FIRST_ISCR, BUFS_UNIT, BUFS, and TS_RATE fields are provided in type B IN-BAND signalling.

Also, thereafter, eight-bit RESERVED B is available.

As described above, in type B IN-BAND signalling, arbitrary information can be assigned to eight-bit RESERVED_B. In the present technology, therefore, information regarding emergency warning is assigned to this eight-bit RESERVED_B.

It should be noted that details of each field provided in type B IN-BAND signalling are given in "5.2.3.2 In-band type B" in NPL 1 described above. Therefore, a detailed description thereof is omitted here.

As described above, the present technology enables assignment of information regarding emergency warning to RESERVED, AUX_PRIVATE_CONF, and AUX_PRIVATE_DYN bits of L1-post signalling, or bits of RESERVED of IN-BAND signalling. A description will be given below of specific examples of bit assignment to information regarding emergency warning.

4. Specific Examples of Bit Assignment (First Example of Bit Assignment)

FIG. 10 is a diagram illustrating a first example of bit assignment.

In the first example of bit assignment, a case is illustrated in which information regarding emergency warning is assigned to 30-bit RESERVED_2 in Configurable L1-post signalling.

That is, in the first example of bit assignment, the 30 bits of RESERVED_2 in Configurable L1-post signalling are assigned to EMERGENCY_WARNING, EWS_VERSION, SERVICE_ID, and EWS_CODE.

One-bit EMERGENCY_WARNING is a flag indicating that emergency warning information is transported. Hereinafter, this flag will be also referred to as emergency warning notice information (emergency warning flag).

Five-bit EWS_VERSION indicates a version of emergency warning information. This version is incremented in a case where details of emergency warning information are changed.

16-bit SERVICE_ID indicates an identifier of a service to which the reception apparatus 30 on standby tunes after automatic startup.

Eight-bit EWS_CODE indicates a type code of emergency warning. A disaster type such as earthquake or typhoon is, for example, specified as this type code.

As described above, in the first example of bit assignment, EMERGENCY_WARNING is prescribed in RESERVED_2 in configurable L1-post signalling. Therefore, in a case of provision of emergency warning information, the reception apparatus 30 on standby can start up automatically.

That is, for example, in a case where the reception apparatus 30 as a TV receiver is on standby, and when EMERGENCY_WARNING='0' is specified as emergency warning notice information being monitored, no emergency warning information has been provided. Therefore, the reception apparatus 30 remains on standby. On the other hand, when EMERGENCY_WARNING='1' is specified as emergency warning notice information being monitored, emergency warning information has been provided. Therefore, the reception apparatus 30 on standby starts up automatically.

At this time, the reception apparatus 30 that has started up automatically tunes to a broadcasting service (emergency warning service) corresponding to a service ID specified in SERVICE_ID prescribed in RESERVED_2 in Configurable L1-post signalling. As a result, emergency warning information is presented (notified) by the emergency warning service.

Also, in the first example of bit assignment, EWS_VERSION is prescribed in RESERVED_2 in Configurable L1-post signalling. This makes it possible to manage the version of emergency warning information. As a result, in a case where the reception apparatus 30 is put back into standby by the user after having been automatically started on purpose while on standby, and when the same EWS_VERSION is specified as at the time of automatic startup to emergency warning information, it is possible to implement the reception apparatus 30, for example, in such a manner as to prevent the reception apparatus 30 from starting up automatically again.

Further, by setting, in advance, a type of emergency warning in emergency warning information (e.g., a disaster type such as earthquake or typhoon) that will be provided on the reception apparatus 30, it is possible to perform a determination process to determine whether the type matches with the type of emergency warning specified in EWS_CODE of RESERVED_2 in Configurable L1-post signalling.

Then, in a case where the reception apparatus 30 on standby receives emergency warning notice information (EMERGENCY_WARNING='1'), and when there is a match in emergency warning type, the emergency warning information falls under the target type. As a result, the reception apparatus 30 starts up automatically. As described above, the reception apparatus 30 can present (notify) only emergency warning information regarding a specific disaster such as earthquake or typhoon to the user.

(Second Example of Bit Assignment)

FIG. 11 is a diagram illustrating a second example of bit assignment.

In the second example of bit assignment, a case is illustrated in which information regarding emergency warning is assigned to 30-bit RESERVED 2 and 28-bit AUX_PRIVATE_CONF in Configurable L1-post signalling.

That is, in the second example of bit assignment, the 30 bits of RESERVED_2 in Configurable L1-post signalling are assigned to one-bit EMERGENCY_WARNING, five-bit EWS_VERSION, 16-bit SERVICE_ID, and eight-bit EWS_CODE as in the first example of bit assignment illustrated in FIG. 10.

Also, in the second example of bit assignment, '1111' indicating "Emergency Signalling" is specified in AUX_STREAM_TYPE in Configurable L1-post signalling, and COUNTRY CODE, REGION CODE, and RESERVED are assigned to the 28 bits of AUX_PRIVATE_CONF as information regarding emergency warning.

The 16-bit COUNTRY CODE indicates a country code. Two-byte code of ISO 3166-1 alph-2 prescribed by the International Organization for Standardization (ISO: International Organization for Standardization), for example, can be used as this country code.

The eight-bit REGION CODE indicates a domestic region code. A code for classifying regions into which each country determined, for example, by a country code is divided can be used as this region code.

The four-bit RESERVED is a region for future expansion.

As described above, in the second example of bit assignment, EMERGENCY_WARNING is prescribed in RESERVED_2 in Configurable L1-post signalling, and further, COUNTRY_CODE and REGION_CODE are prescribed in AUX_PRIVATE_CONF. This makes it possible to enable emergency warning notice information on the reception apparatus 30 only in a specific region of a specific country.

That is, by setting, in advance, a country code and a region code corresponding to the installation position of the reception apparatus 30 and the like, on the reception apparatus 30, it is possible to perform a determination process to determine whether the codes match with the country code and the region code specified in COUNTRY_CODE and REGION_CODE of AUX_PRIVATE_CONF in configurable L1-post signalling.

Then, in a case where the reception apparatus 30 on standby receives emergency warning notice information (EMERGENCY_WARNING='1'), and when there is a match in country code and region code, the reception apparatus 30 is located in the target region for emergency warning information. As a result, the reception apparatus 30 starts up automatically. On the other hand, even in a case where the reception apparatus 30 on standby receives emergency warning notice information (EMERGENCY_WARNING='1'), and when there is a mismatch in country code and region code, the reception apparatus 30 is not located in the target region for emergency warning information. Therefore, the reception apparatus 30 remains on standby.

As described above, even in a case where emergency warning information to be notified varies from one country to another or from one region to another, it is possible to provide emergency warning information to the reception apparatuses 30 on a country-by-country or region-by-region basis by using COUNTRY_CODE and REGION_CODE.

Also, a type of emergency warning in emergency warning information (e.g., a disaster type such as earthquake or typhoon) that will be provided is set in advance on the reception apparatus 30, thereby making it possible to perform a determination process to determine whether the type matches with the type of emergency warning specified in EWS_CODE of RESERVED_2 in Configurable L1-post signalling.

Then, in a case where the reception apparatus 30 on standby receives emergency warning notice information (EMERGENCY_WARNING='1'), and when there is a match not only in country code and region code but also in emergency warning type, the reception apparatus 30 is located in the target region for emergency warning information, and the emergency warning information falls under the target type. As a result, the reception apparatus 30 starts up. As described above, the reception apparatus 30 can present (notify) only emergency warning information regarding a specific disaster such as earthquake or typhoon on a country-by-country or region-by-region basis.

(Third Example of Bit Assignment)

FIG. 12 is a diagram illustrating a third example of bit assignment.

In the third example of bit assignment, a case is illustrated in which information regarding emergency warning is assigned to 30-bit RESERVED_2 and 28-bit AUX_PRIVATE_CONF in Configurable L1-post signalling.

That is, in the third example of bit assignment, the 30 bits of RESERVED_2 in configurable L1-post signalling are assigned to one-bit EMERGENCY_WARNING, five-bit EWS_VERSION, 16-bit SERVICE_ID, and eight-bit EWS_CODE as in the first example of bit assignment illustrated in FIG. 10.

Also, in the third example of bit assignment, '1111' indicating "Emergency Signalling" is specified in AUX_STREAM_TYPE in L1-post signalling, and COUNTRY_CODE, REGION_CODE, AUX_EWS_STREAM, AUX_EWS_STREAM_TYPE, and RESERVED are assigned to the 28 bits of AUX_PRIVATE_CONF as information regarding emergency warning.

The 16-bit COUNTRY_CODE and the eight-bit REGION_CODE indicate a country code and a region code, respectively, as in the second example of bit assignment illustrated in FIG. 11.

One-bit AUX_EWS_STREAM is a flag indicating that additional information regarding emergency warning will be transported as an auxiliary stream (Auxiliary Stream).

The two-bit AUX_EWS_STREAM_TYPE indicates a type of auxiliary stream (EWS auxiliary stream) that carries additional information. As this type, the following three types can be, for example, assigned according to the additional information type. It should be noted that although four types can be specified in this example of two bits, a case is illustrated here in which a future reservation area is secured.

0: Text data
1: Audio data
2: Application startup information
3: Future reservation area The one-bit RESERVED is an area for future expansion.

As described above, in the third example of bit assignment, AUX_EWS_STREAM and AUX_EWS_STREAM_TYPE are prescribed in AUX_PRIVATE_CONF in Configurable L1-post signalling. This makes it possible to notify details of an EWS auxiliary stream by using AUX_EWS_STREAM and AUX_EWS_STREAM_TYPE in combination in a case of provision of the EWS auxiliary stream.

For example, in a case where the reception apparatus 30 on standby receives emergency warning notice information (EMERGENCY_WARNING='1'), and when AUX_EWS_STREAM='1' and AUX_EWS_STREAM_TYPE='0' are specified, text data transported as an EWS auxiliary stream can be used after automatic startup.

For example, this text data is in a format that can be read by a TTS (Text To Speech) engine provided in the reception apparatus 30. It should be noted that the TTS engine is a text-to-speech synthesizer (Text To Speech Synthesizer) capable of artificially creating human voice from text data.

By allowing text data to be read out loud, it is possible, for example, to ensure improved accessibility for the visually handicapped.

Similarly, in a case where emergency warning notice information (EMERGENCY_WARNING='1') is received, and when AUX_EWS_STREAM='1' and AUX_EWS_STREAM_TYPE='1' are specified, audio data transported as an EWS auxiliary stream can be used after automatic startup. When AUX_EWS_STREAM_TYPE='2' is specified, startup information transported as an EWS auxiliary stream can be used after automatic startup.

For example, audio data is in a format that enables audio to be output from a speaker of the reception apparatus 30. Also, for example, startup information is that of application which enables the reception apparatus 30 to start up.

More specifically, for example, in a case where the reception apparatus 30 that supports HbbTV (Hybrid Broadcast Broadband TV) whose service has launched in Europe as a broadcast/communication-linked service acquires a URL (Uniform Resource Locator) of an HbbTV application as startup information transported as an EWS auxiliary stream, the HbbTV application is acquired via a communication line such as the Internet and started up. Here, for example, emergency warning information and detailed information thereof is presented by this HbbTV application.

It should be noted that text data, audio data, and application startup data transported as an EWS auxiliary stream listed here are merely examples of additional information, and other information may be transported. Also, in a case where other information is transported as additional information, the type of that information is defined as AUX_EWS_STREAM_TYPE.

As additional information, for example, tuning information for tuning to a service after automatic startup of the reception apparatus 30 on standby or other information may be transported as an EWS auxiliary stream. For example, so-called triplet (Triplet), network ID (Network ID), event ID (Event ID), and so on can be used as this tuning information. It should be noted that a triplet refers to a combination of a transport stream ID (TS_ID), a PLP_ID (PLP_ID), and a service ID (Service_ID).

(Forth Example of Bit Assignment)

FIG. 13 is a diagram illustrating a fourth example of bit assignment.

In the fourth example of bit assignment, a case is illustrated in which information regarding emergency warning is assigned to 30-bit RESERVED_2 in Configurable L1-post signalling and 48-bit AUX_PRIVATE_DYN in Dynamic L1-post signalling.

In the fourth example of bit assignment, the 30 bits of RESERVED_2 in Configurable L1-post signalling are assigned to EMERGENCY_WARNING, EWS_VERSION, COUNTRY_CODE, and REGION_CODE.

The one-bit EMERGENCY_WARNING and the five-bit EWS_VERSION indicate versions of emergency warning notice information and emergency warning information, respectively, as in the first example of bit assignment illustrated in FIG. 10.

The 16-bit COUNTRY_CODE indicates a country code. The code prescribed in ISO 3166-1 alph-2, for example, can be used as this country code.

The eight-bit REGION_CODE indicates a domestic region code. A code for classifying regions into which each country determined, for example, by a country code is divided can be used as this region code.

Also, in the fourth example of bit assignment, '1111' indicating "Emergency Signalling" is specified in AUX_STREAM_TYPE in Configurable L1-post signalling, and TS_ID, PLP_ID, SERVICE_ID, and EWS_CODE are assigned to 48 bits of AUX_PRIVATE_DYN in Dynamic L1-post signalling as information regarding emergency warning.

The 16-bit TS_ID indicates a transport stream ID, an identifier of a transport stream (TS: Transport Stream) to which the reception apparatus 30 on standby tunes after automatic startup.

The eight-bit PLP_ID indicates a PLP_ID, an identifier of a PLP (Physical Layer Pipe) to which the reception apparatus 30 on standby tunes after automatic startup.

The 16-bit SERVICE_ID indicates a service ID which is an identifier of a service to which the reception apparatus 30 on standby tunes after automatic startup.

The eight-bit EWS_CODE indicates a type code of emergency warning.

As described above, in the fourth example of bit assignment, COUNTRY_CODE and REGION_CODE are prescribed together with EMERGENCY_WARNING in RESERVED_2 in Configurable L1-post signalling. This makes it possible to enable emergency warning notice information (EMERGENCY_WARNING='1') on the reception apparatus 30 only in a specific region of a specific country.

Also, in the fourth example of bit assignment, TS_ID, PLP_ID, and SERVICE_ID are prescribed in AUX_PRIVATE_DYN in Dynamic L1-post signalling. Therefore, the reception apparatus 30 on standby tunes to the broadcasting service (emergency warning service) specified by this triplet after automatic startup. Here, by this emergency warning service, for example, the emergency warning information and detailed information thereof are presented.

Further, by setting, in advance, a type of emergency warning in emergency warning information (e.g., a disaster type such as earthquake or typhoon) that will be provided on the reception apparatus 30, it is possible to perform a determination process to determine whether the type matches with the type of emergency warning specified in EWS_CODE of AUX_PRIVATE_DYN in Dynamic L1-post signalling and present, according to the determination result thereof, only emergency warning information regarding a specific disaster such as earthquake or typhoon as in the above examples of bit assignment.

It should be noted that the four examples of bit assignment described above are merely examples, and that information regarding emergency warning can be assigned to target bits by using RESERVED, AUX_PRIVATE_CONF, and AUX_PRIVATE_DYN in L1-post signalling alone or in combination.

Also, although cases were illustrated in the four examples of bit assignment described above in which information regarding emergency warning has been assigned to the bits of RESERVED, AUX_PRIVATE_CONF, and AUX_PRIVATE_DYN in L1-post signalling, likewise, information regarding emergency warning (e.g., EMERGENCY_WARNING, EWS_CODE, COUNTRY_CODE, REGION_CODE, and the like) can be assigned to the bits of RESERVED in IN-BAND signalling.

Further, it is possible to not only assign information regarding emergency warning to the bits in L1-post signalling and IN-BAND signalling but also to assign, part of information regarding emergency warning to the bits of RESERVED, AUX_PRIVATE_CONF, and AUX_PRIVATE_DYN in L1-post signalling and remaining information to the bits of RESERVED in IN-BAND signalling.

5. Supporting the M-PLP Scheme

Incidentally, an M-PLP (Multiple PLP) scheme is prescribed in the DVB-T2 standard. This M-PLP scheme allows to support up to 256 PLPs (Physical Layer Pipes). It should be noted, however, that the standard prescribes that it is the transmission apparatus 20 on the transmitting side that supports up to 256 PLPs, and that the reception apparatuses 30 on the receiving side need not receive 256 PLPs simultaneously and need only receive a minimum of two PLPs.

Of these two PLPs, one is a Common PLP, and the other is a Data PLP. Here, a Common PLP is a packet sequence generated by extracting common packets from packets included in a plurality of transport streams (TS: Transport Stream). Also, a Data PLP is a packet sequence into which common packets are extracted from packets included in a transport stream (TS).

Figure 14:
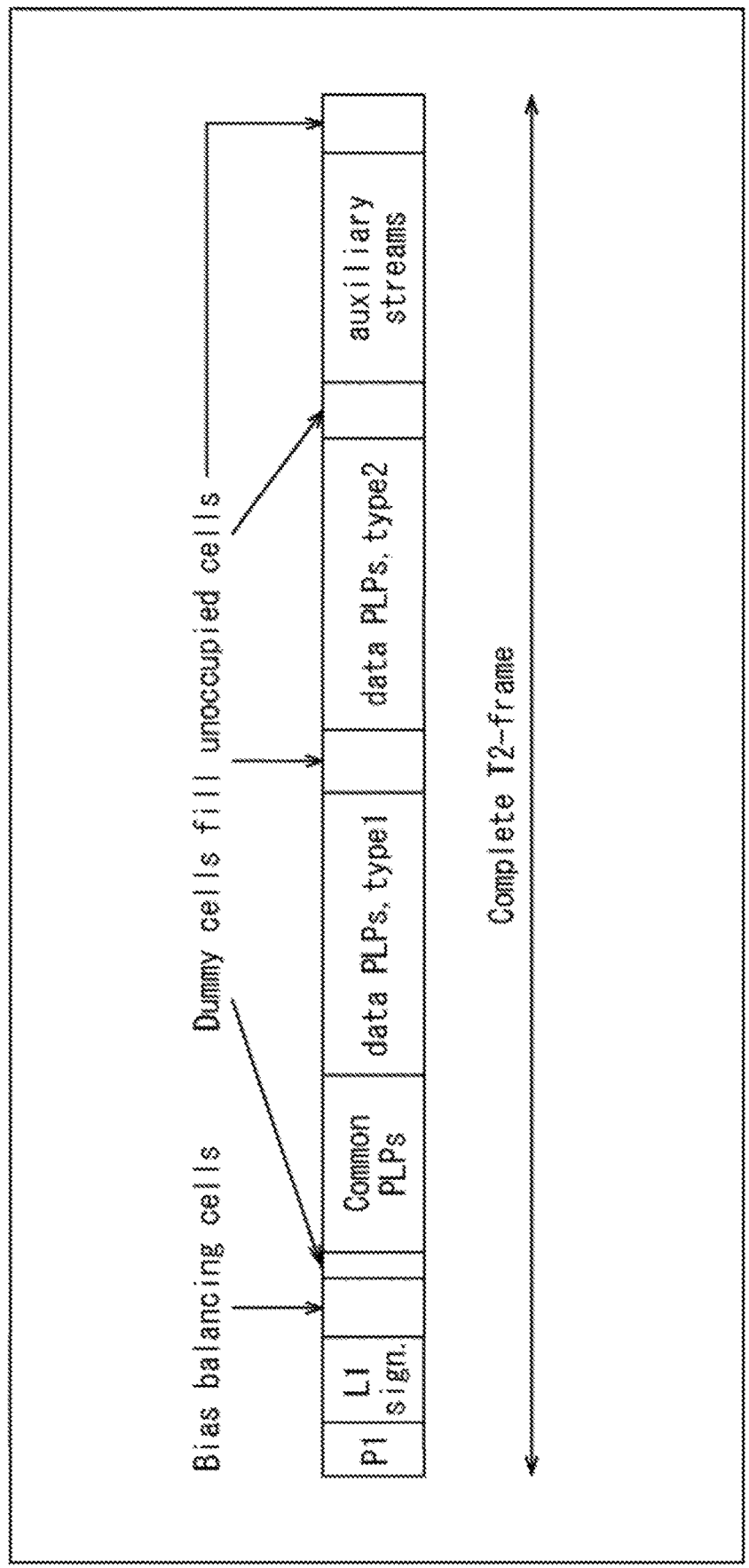
FIG. 14 is a diagram illustrating a structure of a T2 frame including a Common PLP and a Data PLP.

A T2 frame including a Common PLP and Data PLPs can be represented, for example, by a structure as illustrated in FIG. 14. That is, in FIG. 14, the T2 frame includes one Common PLP and two Data PLPs. It should be noted that the T2 frame illustrated in FIG. 14 includes auxiliary streams (auxiliary streams) and that dummy cells and on so are inserted in part thereof.

(Emergency Warning Information Transport Method in the M-PLP Scheme)

Figure 15:
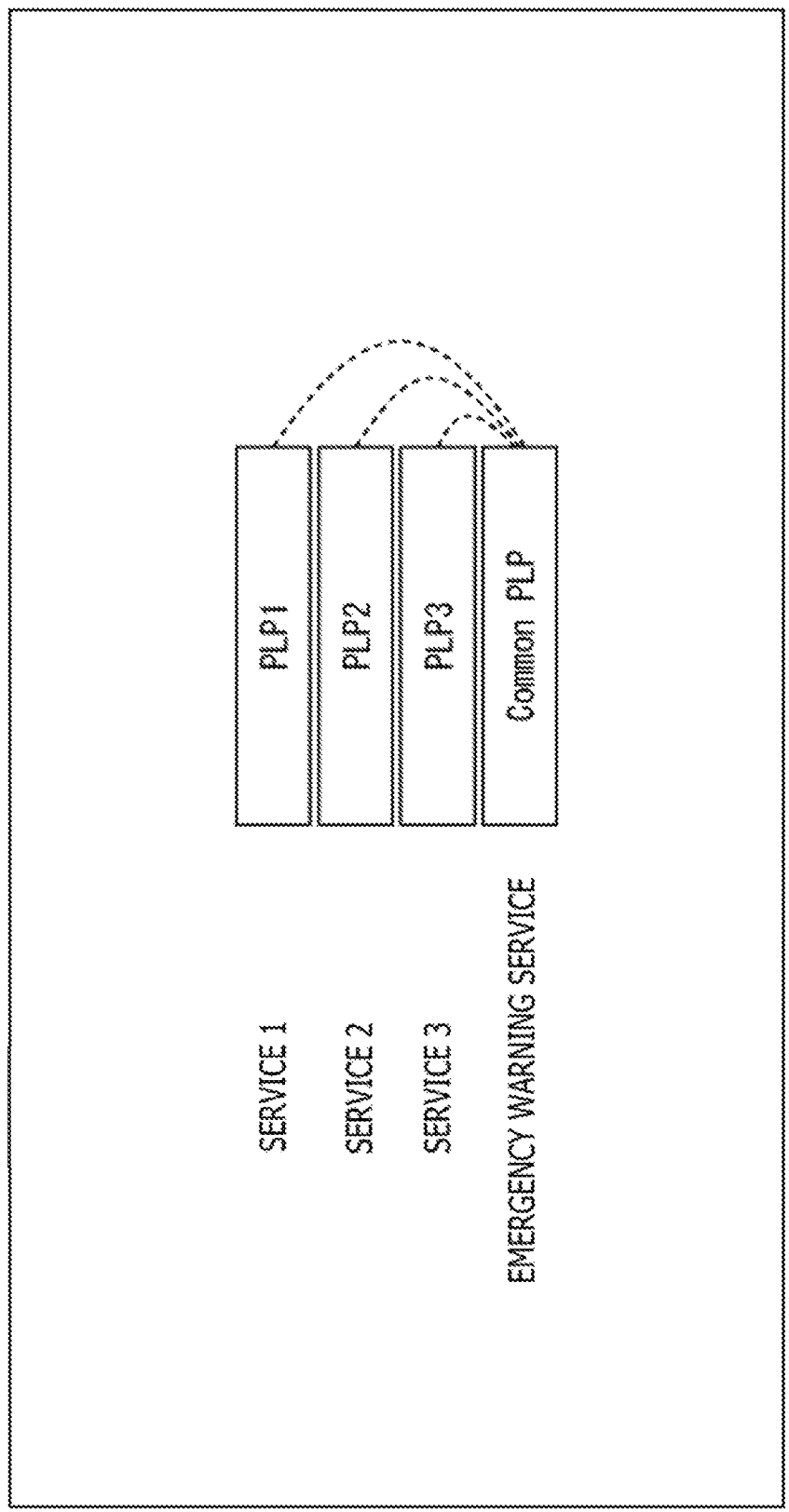
FIG. 15 is a diagram illustrating an emergency warning information transport scheme in a case where an M-PLP scheme is used.

FIG. 15 is a diagram illustrating an emergency warning information transport scheme in a case where the M-PLP scheme is used.

FIG. 15 illustrates a case in which one Common PLP is transported for three Data PLPs in a case where a PLP1 carries a service 1, a PLP2 carries a service 2, and a PLP3 carries a service 3. Here, emergency warning services for providing emergency warning information are carried by the Common PLP.

As described above, in a case where the M-PLP scheme is used, emergency warning information can be commonized for the PLP1 through PLP3 by transporting emergency warning services with a Common PLP. This eliminates the need to transport redundant data, ensuring, as a result, a reduced data volume to be transported as a whole.

Also, as illustrated in FIG. 14, in the T2 frame, the Common PLP is provided at the beginning preceding other PLPs (Data PLPs). This allows for the reception apparatus 30 to acquire and process emergency warning information carried by the Common PLP more quickly than the data transported by the Data PLPs.

(Emergency Warning Information Transport Scheme for Each PLP Group)

Figure 16:
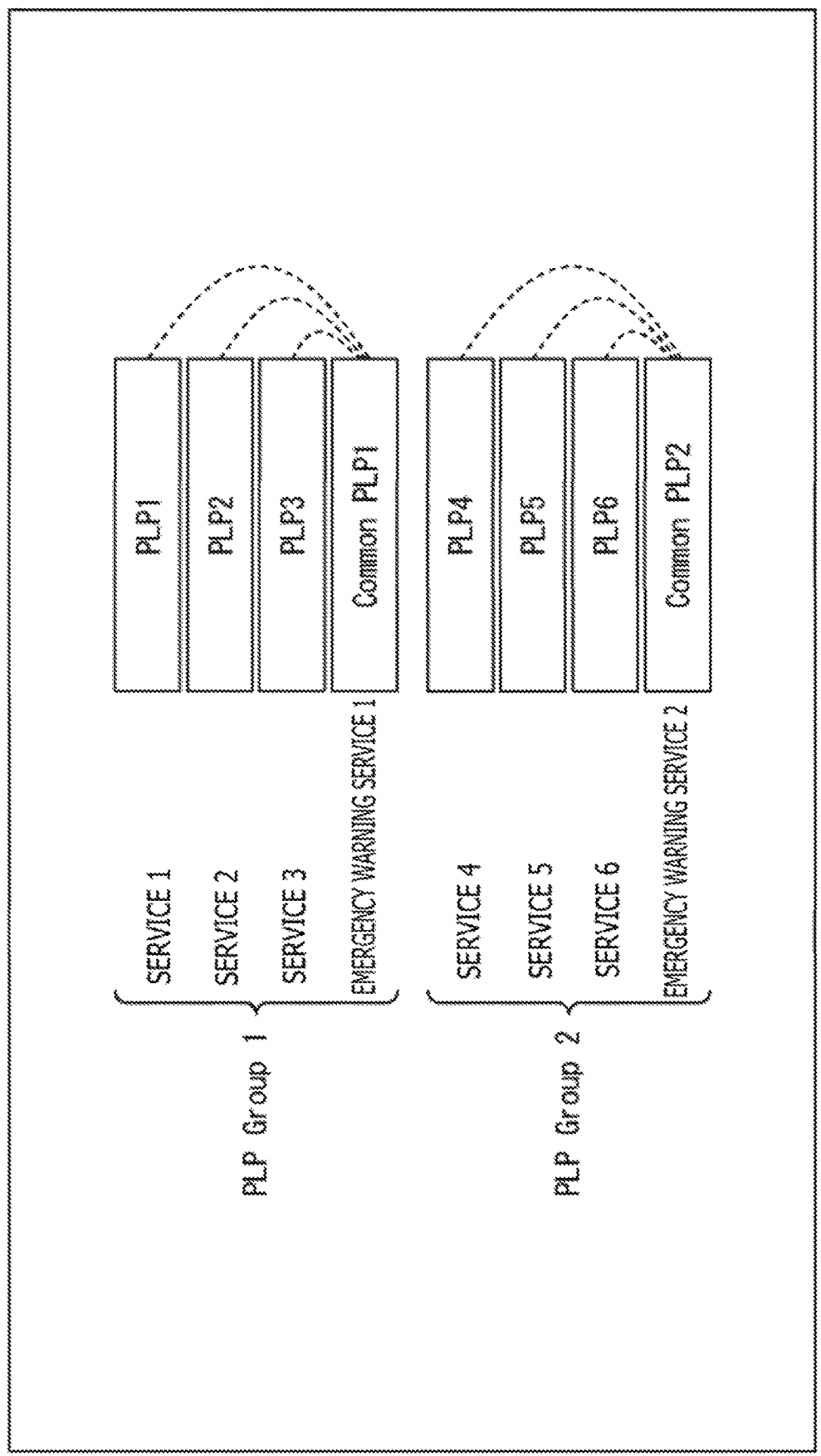
FIG. 16 is a diagram illustrating an emergency warning information transport scheme for each PLP group in a case where the M-PLP scheme is used.

FIG. 16 is a diagram illustrating an emergency warning information transport scheme for each PLP group in a case where the M-PLP scheme is used.

FIG. 16 illustrates a case in which one Common PLP is transported for a plurality of Data PLPs for each of two groups, a PLP Group 1 and a PLP Group 2.

Specifically, the PLP Group 1 includes the PLP1 carrying the service 1, the PLP2 carrying the service 2, the PLP3 carrying the service 3, and a Common PLP1 for these three Data PLPs. On the other hand, the PLP Group 2 includes a PLP4 carrying a service 4, a PLP5 carrying a service 5, a PLP6 carrying a service 6, and a Common PLP2 for these three Data PLPs.

Here, in a case where there are a plurality of such PLP groups, emergency warning services for providing emergency warning information are transported by a Common PLP for each PLP group.

That is, in the PLP Group 1, the emergency warning service 1, a common service for the PLP1 through the PLP3 is carried by the Common PLP1. On the other hand, in the PLP Group 2, the emergency warning service 2, a common service for the PLP4 through the PLP6 is carried by the Common PLP2.

As described above, in a case where the M-PLP scheme is used, and when a plurality of PLP groups are available, it is possible to commonize emergency warning information for Data PLPs for each PLP group by transporting an emergency warning service using a Common PLP for each PLP group. This eliminates the need to transport redundant data, ensuring, as a result, a reduced data volume to be transported as a whole.

Also, as illustrated in FIG. 14, in the T2 frame, the Common PLP is provided at the beginning of the same PLP group. This allows for the reception apparatus 30 to acquire and process emergency warning information carried by the Common PLP more quickly than the data transported by the Data PLPs.

It should be noted that, as illustrated in FIG. 5, the PLP group to which each PLP belongs can be identified by an identifier specified in PLP_GROUP_ID provided in the PLP group in Configurable L1-post signalling.

6. Example of Emergency Warning Notice Information

Although being a one-bit flag (emergency warning flag) in the description given above, emergency warning notice information is not limited to one bit and can be two-bit or larger information.

For example, ATSC (Advanced Television Systems Committee) 3.0, a next-generation terrestrial broadcasting standard, prescribes that information corresponding to emergency warning notice information should be two bits. Likewise, in the present technology, however, such information can be two bits. Here, a description will be given of Wake-up bits of emergency warning prescribed in the ATSC3.0 standard with reference to FIGS. 17 to 20.

The physical layer frame prescribed in the ATSC3.0 standard includes a bootstrap (BS: Bootstrap), a preamble (Preamble), and a data portion (Data).

Here, the bootstrap corresponds to a P1 symbol included in the T2 frame of the DVB-T2 standard. Also, the preamble corresponds to a P2 symbol included in the T2 frame of the DVB-T2 standard. Therefore, it can be said that a bootstrap is a preamble signal.

(Bootstrap Structure)

Figure 17:
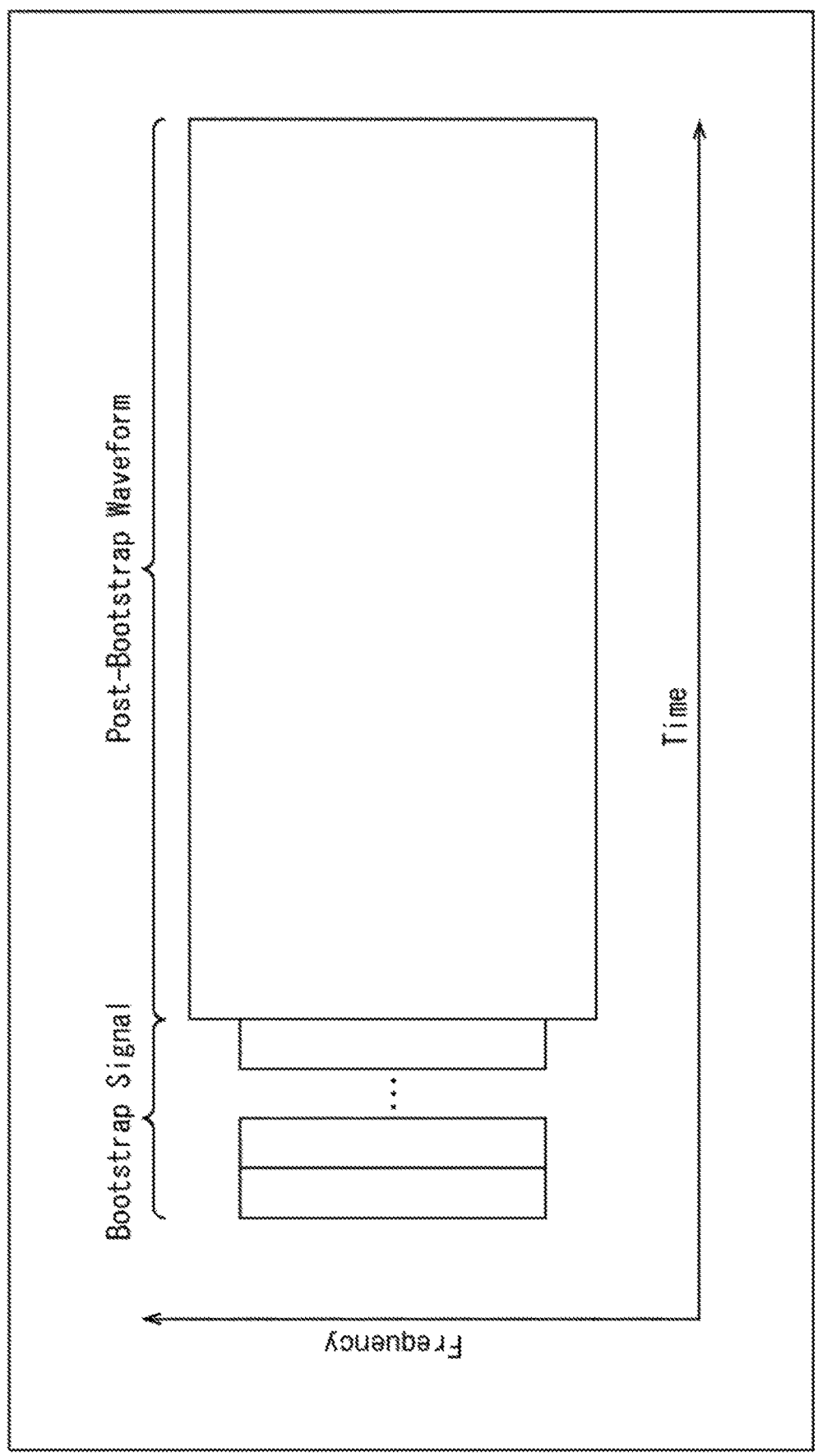
FIG. 17 is a diagram illustrating a structure of a bootstrap in a physical layer frame.

FIG. 17 illustrates a structure of a bootstrap in a physical layer frame.

In FIG. 17, the bootstrap includes a Bootstrap Signal and a Post-Bootstrap Waveform. A plurality of Bootstrap Symbols are provided in a Bootstrap Signal field.

FIG. 18 illustrates a syntax of a Bootstrap Symbol 1. A one-bit ea_wake_up_1 field is provided in this Bootstrap Symbol 1. ea_wake_up_1 is a bit for starting a device in response to an emergency warning (Emergency Alert).

FIG. 19 illustrates a syntax of a Bootstrap Symbol 2. A one-bit ea_wake_up_2 field is provided in this Bootstrap Symbol 2. ea_wake_up_2 is a bit for starting a device in response to an emergency warning.

Then, the one bit of ea_wake_up_1 of the Bootstrap Symbol 1 illustrated in FIG. 18 and the one bit of ea_wake_up_2 of the Bootstrap Symbol 2 illustrated in FIG. 19 are linked together to form two-bit Wake-up bits. It should be noted, however, that, here, of the two bits, the lowest-order bit is formed by the one bit of ea_wake_up_1, and the highest-order bit is formed by the one bit of ea_wake_up_2.

The meanings of values of the two-bit Wake-up bits formed in this manner are illustrated in FIG. 20. As illustrated in FIG. 20, the Wake-up bits can be assigned four meanings, '00,' '01,' '10,' and '11,' by having two bits.

It should be noted that details of the Bootstrap Symbol 1 and the Bootstrap Symbol 2 are given in "6. BOOTSTRAP SIGNAL STRUCTURE" in NPL 2 listed below. Also, details of the meanings of values of the two-bit Wake-up bits are given in "Annex G: Emergency Alert Signaling" in NPL 3 listed below.

NPL 2: ATSC Standard: A/321, System Discovery and Signaling

NPL 3: ATSC Candidate Standard: Signaling, Delivery, Synchronization, and Error Protection (A/331)

In the present technology, emergency warning notice information (EMERGENCY_WARNING) can have four meanings by having two bits as do the Wake-up bits prescribed in the ATSC 3.0 standard. Also, although a case was illustrated here in which emergency warning notice information (EMERGENCY_WARNING) had two bits, emergency warning notice information may be assigned further more meanings by having three or more bits.

7. Example of Low Power Consumption Mode (Comparison Between the Current DVB-EWS Scheme and the Scheme of the Present Technology)

Figure 21:
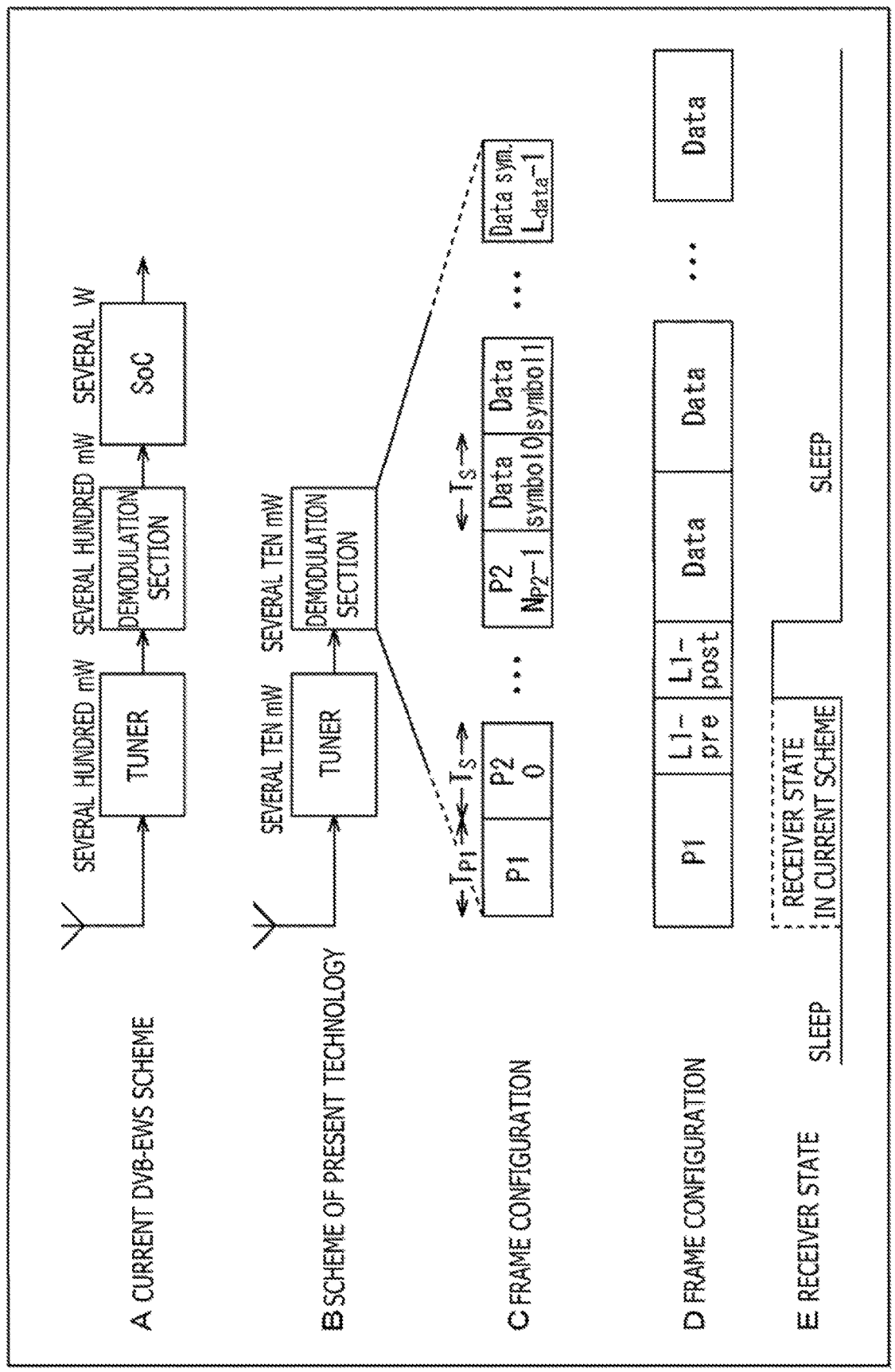
FIG. 21 depicts diagrams describing power consumption in a case where the scheme of the present technology is adopted.

Next, the current DVB-EWS scheme and the scheme of the present technology will be compared in terms of power consumption with reference to FIG. 21. It should be noted that a receiver capable of receiving a broadcast signal compliant with the DVB-T2 standard normally includes three chips, namely, a tuner, a demodulation section (demodulator), and a system-on-chip (SoC).

As illustrated in A of FIG. 21, in a case where the current DVB-EWS scheme is adopted, and if no signal is supplied to the system-on-chip (SoC) provided at the later stage of the tuner and the demodulation section, SI (Service Information) information (DVB-SI information) cannot be analyzed in the receiver.

In this case, the receiver consumes several hundred mW of power for each of the tuner and the demodulation section to operate the tuner and the demodulation section and further consumes several W of power to operate the system-on-chip (SoC).

On the other hand, in a case where the scheme of the present technology (L1-post signalling transport scheme) is adopted as illustrated in B of FIG. 21, the demodulation section demodulates the P1 and P2 symbols included in the T2 frame and monitors (analyzes) emergency warning notice information (EMERGENCY_WARNING) provided in L1-post signalling that is included in the P2 symbol (refer to frame structures illustrated in C and D of FIG. 21).

In this case, emergency warning notice information (EMERGENCY_WARNING) is monitored (analyzed) by the demodulation section at the preceding stage of the system-on-chip (SoC). Therefore, only several tens of mW of power are consumed to operate the tuner and the demodulation section, and there is no need to operate the highly power consuming system-on-chip (SoC).

As described above, the current DVB-EWS scheme has required the operation of the highly power consuming system-on-chip (SoC) to monitor (analyze) SI information. In the scheme of the present technology (L1-post signalling transport scheme), however, emergency warning notice information (EMERGENCY_WARNING) provided in L1-post signalling is monitored, thus eliminating the need to operate the system-on-chip (SoC) and keeping down power consumption.

Also, as illustrated in E of FIG. 21, in a case where the scheme of the present technology (L1-post signalling transport scheme) is adopted, the receiver can operate in a mode (low power consumption mode) in which emergency warning notice information (EMERGENCY_WARNING) provided in L1-post signalling included in the P2 symbol is monitored (analyzed) by the demodulation section and in which when other data symbol is received, the receiver is put into a sleep state.

Then, in a case where emergency warning notice information (EMERGENCY_WARNING) provided in L1-post signalling included in the P2 symbol indicates that emergency warning information has been carried (in a case where a transition from '0' to '1' occurs), the receiver starts the system-on-chip (SoC), acquires emergency warning information transported from the transmitter, and outputs the information.

It should be noted, however, that, at present, it is necessary to demodulate the P1 symbol in order to demodulate the P2 symbol. Therefore, only when the P1 and P2 symbols included in the T2 frame are received, the demodulation section monitors emergency warning notice information (EMERGENCY_WARNING) provided in L1-post signalling that is included in the P2 symbol. However, it is necessary to monitor only emergency warning notice information, thereby simplifying processes.

8. Flow of the Emergency Warning Information Response Processes (Emergency Warning Information Response Processes)

A description will be given next of a flow of emergency warning information response processes on the transmitting side and the receiving side with reference to the flowchart illustrated in FIG. 22.

Figure 22:
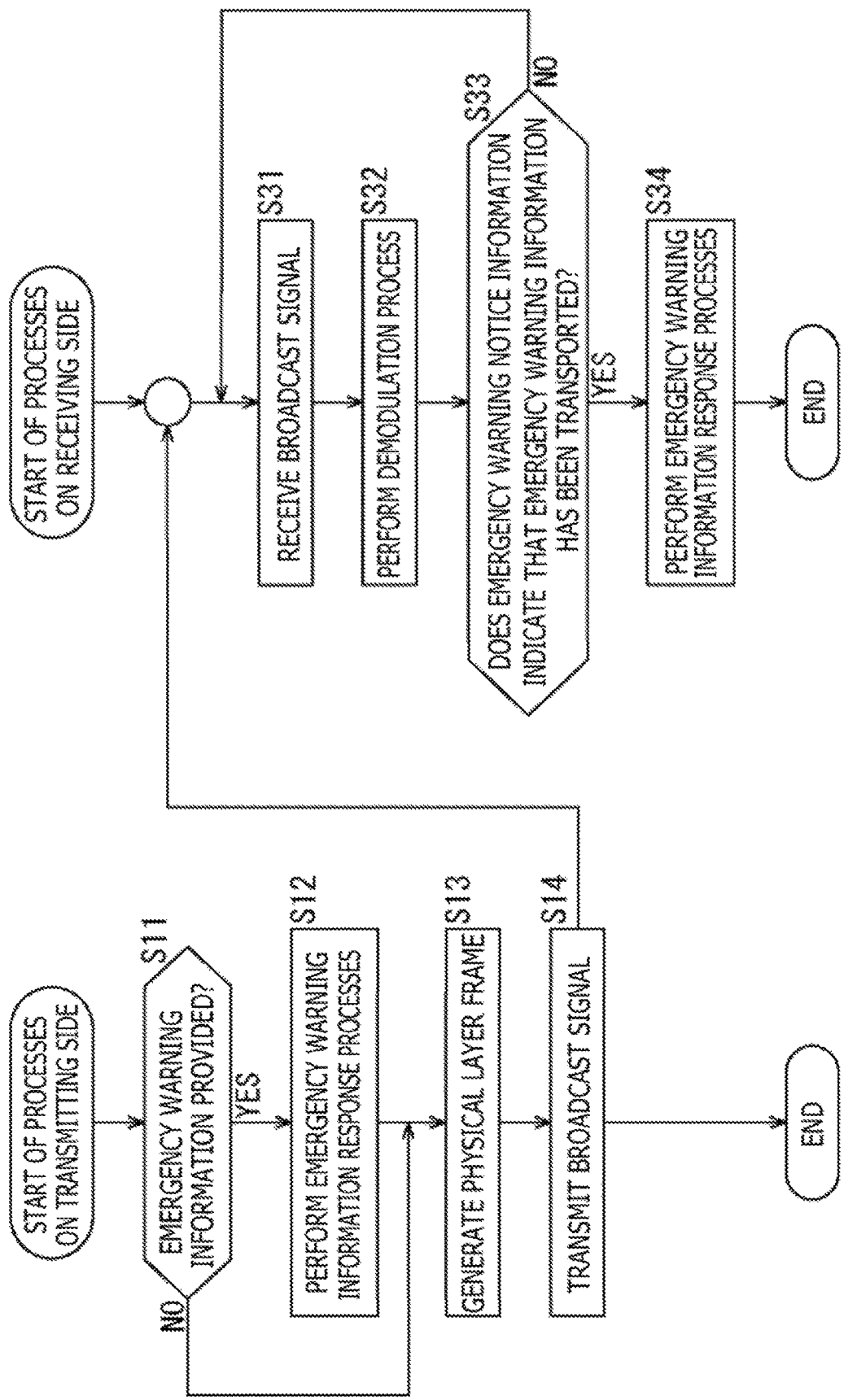
FIG. 22 is a flowchart describing a flow of emergency warning information response processes on a transmitting side and a receiving side.

It should be noted that, in FIG. 22, the processes from step S11 to step S14 are performed by the data processing apparatus 10 or the transmission apparatus 20 on the transmitting side, and the processes from step S31 to step S34 are performed by the reception apparatus 30 on the receiving side.

In step S11, whether emergency warning information has been provided is determined. This determination process determines, for example, whether emergency warning information has been provided from a server managed by Japan Meteorological Agency or other governmental organization following a natural disaster such as earthquake or tsunami.

In a case where it is determined in step S11 that emergency warning information has been provided, the process proceeds to step S12. In step S12, emergency warning information response processes are performed by the data processing apparatuses 10 and the transmission apparatus 20.

In this emergency warning information response processes, not only emergency warning notice information indicating the transport of emergency warning information but also characteristic information indicating characteristics of emergency warning information according to details of the emergency warning information and additional information notice information corresponding to whether or not additional information relating to emergency warning information is transported are placed into L1-post signalling or IN-BAND signalling.

Here, for example, a version of emergency warning information, a target country and a target region, a disaster type indicated by details of the emergency warning information are included as characteristic information. Also, information indicating whether or not additional information such as text data, audio data, application startup information, and tuning information after automatic startup has been transported is included as additional information notice information.

It should be noted that in a case where it is determined in step S11 that emergency warning information has not been provided, the process in step S12 is skipped, and the process proceeds to step S13.

In step S13, the data processing section 211 generates a T2 frame as a physical layer frame.

Here, in a case where the emergency warning information response processes (S12) are performed, L1-post signalling or IN-BAND signalling including emergency warning notice information, characteristic information, and so on is placed into the T2 frame as physical layer signalling. Also, an auxiliary stream including additional information such as text data and tuning information is placed into this T2 frame according to details of the additional information notice information.

In step S14, the modulation section 212 performs a necessary process, for example, a modulation process, on the physical layer frame (T2 frame) acquired by the process in step S13 and transmits a broadcast signal acquired as a result thereof from the transmitting antenna installed at the transmitting station.

On the other hand, in step S31, the tuner 311 receives the broadcast signal transmitted from the transmission apparatus 20 via the antenna 321 and performs a necessary process on the broadcast signal.

In step S32, the demodulation section 312 performs a demodulation process on the signal acquired by the process in step S31. As a result of this demodulation process, physical layer signalling such as L1-post signalling or IN-BAND signalling is acquired from the T2 frame.

In step S33, whether emergency warning notice information indicates that emergency warning information has been transported is determined in accordance with the result of the demodulation process in step S32. Here, emergency warning notice information is included in L1-post signalling or IN-BAND signalling.

In a case where it is determined in step S33 that emergency warning notice information does not indicate that emergency warning information has been transported, the process returns to step S31, and the processes from step S31 to step S33 are repeated.

That is, in this case, no emergency warning service is provided. Therefore, in a case where the reception apparatus 30 is, for example, on standby, the demodulation section 312 continues to monitor emergency warning notice information included in L1-post signalling or IN-BAND signalling.

Also, in a case where it is determined in step S33 that emergency warning notice information indicates that emergency warning information has been transported, the process proceeds to step S34. In step S34, the emergency warning information response processes are performed by the reception apparatus 30.

In these emergency warning information response processes, for example, the reception apparatus 30 on standby starts up automatically, receives an emergency warning service, and presents (notifies) the user of emergency warning information.

Also, in a case where characteristic information indicating characteristics of emergency warning information is included in L1-post signalling or other information, the reception apparatus 30 starts up automatically only in a case where the characteristic information matches with the characteristics of the reception apparatus set in advance.

For example, the reception apparatus 30 starts up automatically in a case where the target country and the region of the emergency warning information match with the country and the region set in advance and in a case where the disaster type thereof (e.g., natural disaster such as earthquake or typhoon) matches with the disaster type set in advance.

Also, in a case where additional information notice information is included in L1-post signalling or other signalling and in a case where the additional information notice information indicates that additional information relating to emergency warning information has been transported, the reception apparatus 30 acquires, at the time of automatic startup, additional information such as text data and tuning information transported as an auxiliary stream and performs processes appropriate to the additional information.

The flow of the emergency warning information response processes on the transmitting side and on the receiving side has been described above.

9. Modification Example (Application to Other Broadcasting Scheme)

Although, in the description given above, focus has been placed on DVB (Digital Video Broadcasting), the scheme adopted in European nations and the like as a digital television broadcasting standard, the present technology may be applied to ISDB (Integrated Services Digital Broadcasting) which is the scheme adopted in Japan and the like, or ATSC (Advanced Television Systems Committee) which is the scheme adopted in US and the like.

That is, although emergency warning systems for conveying warning in the event of emergency such as natural disaster are available both in the ISDB standard and the ATSC standard, the application of the present technology allows for provision of an emergency warning service more suited to actual operation.

Also, the present technology is applicable, as a digital television broadcasting standard, not only to terrestrial broadcasting but also to satellite broadcasting using a broadcasting satellite (BS) or a communications satellite (CS) and wired broadcasting using cable television (CATV) and the like.

(Other Example of Packet and Signalling)

Also, the packet, frame, signalling (field thereof), and other names described above are merely examples, and there are cases in which other names may be used. It should be noted, however, that these differences in name are differences in formality and that there is no difference in substantial content of target packet, frame, signalling (field thereof), and the like.

10. Configuration of the Computer

Figure 23:
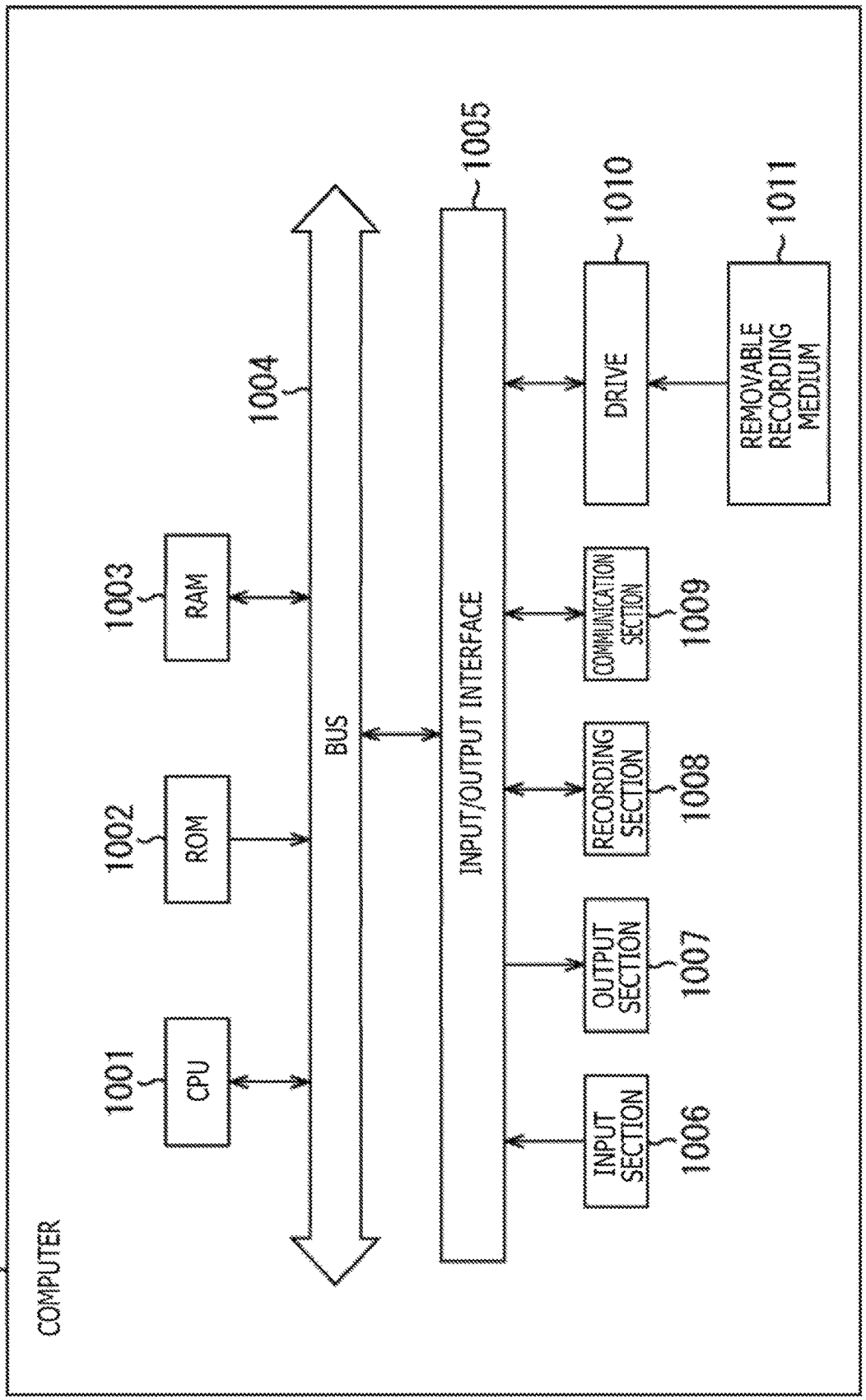
FIG. 23 is a diagram illustrating a configuration example of a computer.

The series of processes described above may be performed by hardware or software. In a case where the series of processes are performed by software, the program included in the software is installed to a computer. FIG. 23 is a diagram illustrating a hardware configuration example of a computer for performing the above series of processes using the program.

In a computer 1000, a CPU (Central Processing Unit) 1001, a ROM (Read Only Memory) 1002, and a RAM (Random Access Memory) 1003 are connected to each other by a bus 1004. An input/output interface 1005 is further connected to the bus 1004. An input section 1006, an output section 1007, a recording section 1008, a communication section 1009, and a drive 1010 are connected to the input/output interface 1005.

The input section 1006 includes a keyboard, a mouse, a microphone, and the like. The output section 1007 includes a display, a speaker, and so on. The recording section 1008 includes a hard disk, a non-volatile memory, and so on. The communication section 1009 includes a network interface and so on. The drive 1010 drives a removable recording medium 1011 such as magnetic disk, optical disc, magneto-optical disk, or semiconductor memory.

In the computer 1000 thus configured, the CPU 1001 loads, for example, the program recorded in the ROM 1002 or the recording section 1008 into the RAM 1003 via the input/output interface 1005 and the bus 1004 for execution, thereby allowing the above series of processes to be performed.

The program executed by the computer 1000 (CPU 1001) can be provided recorded, for example, in the removable recording medium 1011 as a packaged media or the like. Alternatively, the program can be provided via a wired or wireless transport media such as local area network, the Internet, and digital satellite broadcasting.

In the computer 1000, the program can be installed to the recording section 1008 via the input/output interface 1005 by inserting the removable recording medium 1011 into the drive 1010. Alternatively, the program can be received by the communication section 1009 via a wired or wireless transport media and installed to the recording section 1008. In addition to the above, the program can be installed, in advance, to the ROM 1002 or the recording section 1008.

Here, in the present specification, the processes performed by the computer in accordance with the program need not necessarily be performed chronologically in accordance with the sequence described as a flowchart. That is, the processes performed by the computer in accordance with the program include those that are performed in parallel or individually (e.g., parallel processes or object-based processes). Also, the program may be processed by a single computer (processor) or by a plurality of computers in a distributed manner.

It should be noted that embodiments of the present technology are not limited to that described above and can be modified in various ways without departing from the gist of the present technology.

Also, the present technology can have the following configurations:

(1) A reception apparatus including:

a reception section adapted to receive a physical layer frame transported as a broadcast signal; and a demodulation section adapted to demodulate physical layer signalling acquired from the physical layer frame and monitor whether or not emergency warning information has been transported on a basis of emergency warning notice information acquired as a result of the demodulation, the reception apparatus starting up automatically in a case where the emergency warning notice information indicates that the emergency warning information has been transported.

(2) The reception apparatus of feature (1) starting up automatically in a case where characteristic information indicating characteristics of the emergency warning information acquired as the result of the demodulation of the physical layer signalling matches with characteristics of the reception apparatus.

(3) The reception apparatus of feature (2), in which the characteristic information includes at least one of a version of the emergency warning information, a target country and a target region of the emergency warning information, or a disaster type indicated by details of the emergency warning information.

(4) The reception apparatus of feature (2) or (3), in which the characteristic information includes the target country and the target region and the disaster type of the emergency warning information, the reception apparatus starting up automatically in a case where the target country and the target region of the emergency warning information specified as the characteristic information match with a country and a region set in advance and in a case where the disaster type matches with a disaster type set in advance.

(5) The reception apparatus of feature (2) or (3), in which the characteristic information includes the version of the emergency warning information, and in which in a case where emergency warning information of a same version is transported again after automatic startup, the emergency warning information is ignored.

(6) The reception apparatus of any one of features (2) to (5) acquiring and processing additional information transported as an auxiliary stream in a case where additional information notice information acquired as the result of the demodulation of the physical layer signalling indicates that the additional information relating to the emergency warning information has been transported.

(7) The reception apparatus of feature (6), in which the additional information includes at least one of text data, audio data, application startup information, or tuning information after automatic startup.

(8) The reception apparatus of any one of features (1) to (7), in which the physical layer frame complies with a DVB-T2 (Digital Video Broadcasting-Terrestrial 2) standard, and in which the physical layer signalling is L1-post signalling or IN-BAND signalling.

(9) The reception apparatus of feature (8), in which in a case where an M-PLP (Multiple PLP) scheme prescribed in the DVB-T2 standard is used, of a Data PLP and a Common PLP, the Common PLP is used to transport the emergency warning information.

(10) The reception apparatus of feature (9), in which the Common PLP is used to transport the emergency warning information for each PLP group.

(11) A reception method of a reception apparatus, the reception method including:

a step in which the reception apparatus receives a physical layer frame transported as a broadcast signal;

a step in which the reception apparatus demodulates physical layer signalling acquired from the physical layer frame and monitors whether or not emergency warning information has been transported on a basis of emergency warning notice information acquired as a result of the demodulation; and a step in which in a case where the emergency warning notice information indicates that the emergency warning information has been transported, the reception apparatus starts up automatically.

(12) A transmission apparatus including:

a processing section adapted to process physical layer signalling that includes emergency warning notice information corresponding to whether or not emergency warning information has been transported, and to generate a physical layer frame that includes the physical layer signalling; and a transmission section adapted to transmit the physical layer frame as a broadcast signal.

(13) The transmission apparatus of feature (12), in which the physical layer signalling further includes characteristic information indicating characteristics of the emergency warning information.

(14) The transmission apparatus of feature (13), in which the characteristic information includes at least one of a version of the emergency warning information, a target country and a target region of the emergency warning information, or a disaster type indicated by details of the emergency warning information.

(15) The transmission apparatus of feature (13) or (14), in which the physical layer signalling further includes additional information notice information corresponding to whether or not additional information relating to the emergency warning information has been transported, and in which in a case where the additional information notice information indicates that the additional information has been transported, the physical layer frame further includes the additional information as an auxiliary stream.

(16) The transmission apparatus of feature (15), in which the additional information includes at least one of text data, audio data, application startup information, or tuning information after automatic startup.

(17) The transmission apparatus of any one of features (12) to (16), in which the physical layer frame complies with a DVB-T2 standard, and in which the physical layer signalling is L1-post signalling or IN-BAND signalling.

(18) The transmission apparatus of feature (17), in which in a case where an M-PLP scheme prescribed in the DVB-T2 standard is used, of a Data PLP and a Common PLP, the Common PLP is used to transport the emergency warning information.

(19) The transmission apparatus of feature (18), in which the Common PLP is used to transport the emergency warning information for each PLP group.

(20) A transmission method of a transmission apparatus, the transmission method including:

a step in which the transmission apparatus processes physical layer signalling that includes emergency warning notice information corresponding to whether or not emergency warning information has been transported and generates a physical layer frame including the physical layer signalling; and a step in which the transmission apparatus transmits the physical layer frame as a broadcast signal.

REFERENCE SIGNS LIST

1 Transport system
10, 10-1 to 10-N Data processing apparatuses
20 Transmission apparatus
30, 30-1 to 30-M Reception apparatuses 40, 40-1 to 40-N Communication lines
50 Broadcast transport channel
111 Component processing section
112 Signalling generation section
113 Multiplexer
114 Data processing section
211 Data processing section
212 Modulation section
311 Tuner
312 Demodulation section
313 Data processing section
1000 Computer
1001 CPU

The invention claimed is:

1. A reception apparatus, comprising:
reception circuitry configured to receive a preamble of a physical layer frame transported as a broadcast signal; and
processing circuitry configured to, when the reception apparatus is on standby,
obtain physical layer signaling from the preamble of the physical layer frame,
monitor whether or not emergency warning information is transported in a data portion of the physical layer frame on a basis of emergency warning notice information included in the physical layer signaling, and
cause startup of the reception apparatus to receive the emergency warning information in a case where the emergency warning notice information indicates that the emergency warning information is transported in the data portion of the physical layer frame, and characteristic information included in the physical layer signaling indicating characteristics of the emergency warning information match with characteristics of the reception apparatus,
wherein
the characteristic information includes a version of the emergency warning information.

2. The reception apparatus of claim 1, wherein
the characteristic information further includes a target country and a target region, and a disaster type of the emergency warning information, and
the processing circuitry is configured to cause the startup of the reception apparatus in a case where the target country and the target region of the emergency warning information match with a country and a region set in advance and in a case where the disaster type matches with a disaster type set in advance.

3. The reception apparatus of claim 1, wherein
in a case where another emergency warning information transported after the startup of the reception apparatus is of a version same as the version of the emergency warning infoRMation, the other emergency warning information is ignored.

4. The reception apparatus of claim 1, wherein
the physical layer frame complies with a DVB-T2 (Digital Video Broadcasting —Terrestrial 2) standard, and
the physical layer signaling is L1-post signaling.

5. The reception apparatus of claim 4, wherein
in a case where an M-PLP (Multiple PLP) scheme prescribed in the DVB-T2 standard is used, including a Data PLP and a Common PLP, the Common PLP is used to transport the emergency warning information.

6. The reception apparatus of claim 5, wherein
the Common PLP is used to transport the emergency warning information for each PLP group.

7. The reception apparatus of claim 1, wherein
the characteristic information further includes a target country and a target region, a disaster type of the emergency warning information, or tuning information applicable after the startup of the reception apparatus.

8. A reception apparatus, comprising:
reception circuitry configured to receive a preamble of a physical layer frame transported as a broadcast signal; and
processing circuitry configured to:
when the reception apparatus is on standby,
obtain physical layer signaling from the preamble of the physical layer frame,
monitor whether or not emergency warning information is transported in a data portion of the physical layer frame on a basis of emergency warning notice information included in the physical layer signaling, and
cause startup of the reception apparatus to receive the emergency warning information in a case where the emergency warning notice information indicates that the emergency warning information is transported in the data portion of the physical layer frame, and characteristic information included in the physical layer signaling indicating characteristics of the emergency warning information match with characteristics of the reception apparatus; and
after the startup of the reception apparatus,
obtain additional information relating to the emergency warning information from an auxiliary stream included in the data portion of the physical layer frame in a case where additional information notice information included in the physical layer signaling indicates that the additional information relating to the emergency warning information is transported in the auxiliary stream,
wherein
the characteristic information includes a version of the emergency warning information, and
the additional information includes at least one of text data, audio data, application startup information, or tuning information applicable after the startup of the reception apparatus.

9. A reception method of a reception apparatus, the reception method comprising:
receiving, by reception circuitry of the reception apparatus, a preamble of a physical layer frame transported as a broadcast signal; and
when the reception apparatus is on standby,
obtaining, by processing circuitry of the reception apparatus, physical layer signaling from the preamble of the physical layer frame,
monitoring, by the processing circuitry of the reception apparatus, whether or not emergency warning information is transported in a data portion of the physical layer frame on a basis of emergency warning notice information included in the physical layer signaling, and
causing startup of the reception apparatus to receive the emergency warning information in a case where the emergency warning notice information indicates that the emergency warning information is transported in the data portion of the physical layer frame, and characteristic information included in the physical layer signaling indicating characteristics of the emergency warning information match with characteristics of the reception apparatus,
wherein
the characteristic information includes a version of the emergency warning information.

10. A transmission apparatus, comprising:
processing circuitry configured to generate a physical layer frame that includes a preamble and a data portion, the preamble including physical layer signaling that includes emergency warning notice information indicating whether or not emergency warning information is transported in the data portion; and
transmission circuitry configured to transmit the physical layer frame as a broadcast signal,
wherein
the physical layer signaling further includes characteristic information indicating characteristics of the emergency warning information, and
the characteristic information includes a version of the emergency warning information.

11. The transmission apparatus of claim 10, wherein
the physical layer signaling further includes additional information notice information indicating whether or not additional information relating to the emergency warning information is transported, and
in a case where the additional information notice information indicates that the additional information is transported, the data portion of the physical layer frame further includes an auxiliary stream in which the additional information is included.

12. The transmission apparatus of claim 11, wherein
the additional information includes at least one of text data, audio data, application startup information, or tuning information applicable after startup of a reception apparatus.

13. The transmission apparatus of claim 10, wherein
the physical layer frame complies with a DVB-T2 (Digital Video Broadcasting—Terrestrial 2) standard, and
the physical layer signaling is L1 post signaling.

14. The transmission apparatus of claim 13, wherein
in a case where an M-PLP scheme prescribed in the DVB-T2 standard is used, of including a Data PLP and a Common PLP, the Common PLP is used to transport the emergency warning information.

15. The transmission apparatus of claim 14, wherein
the Common PLP is used to transport the emergency warning information for each PLP group.

16. A transmission method of a transmission apparatus, the transmission method comprising:
generating, by processing circuitry of the transmission apparatus, a physical layer frame that includes a preamble and a data portion, the preamble including physical layer signaling that includes emergency warning notice information indicating whether or not emergency warning information is transported in the data portion; and
transmitting, by transmission circuitry of the transmission apparatus, the physical layer frame as a broadcast signal,
wherein
the physical layer signaling further includes characteristic information indicating characteristics of the emergency warning information, and
the characteristic information includes a version of the emergency warning information.

* * * * *